United States Patent
Tejada et al.

(10) Patent No.: US 8,400,545 B2
(45) Date of Patent: Mar. 19, 2013

(54) AMPLIFYING CIRCUIT AND IMAGING DEVICE IMAGING DEVICE

(75) Inventors: Jose Tejada, Valencia (ES); Rafael Dominguez-Castro, Seville (ES); Fernando Medeiro-Hidalgo, Seville (ES); Francisco J. Jimenez-Garrido, Seville (ES)

(73) Assignee: Texas Instruments Incorporated, Dallas, TX (US)

( * ) Notice: Subject to any disclaimer, the term of this patent is extended or adjusted under 35 U.S.C. 154(b) by 433 days.

(21) Appl. No.: 12/702,071

(22) Filed: Feb. 8, 2010

(65) Prior Publication Data

US 2010/0259661 A1    Oct. 14, 2010

(30) Foreign Application Priority Data

Feb. 6, 2009   (JP) .................................. 2009-025714

(51) Int. Cl.
*H04N 5/335*    (2011.01)

(52) U.S. Cl. ....................................................... 348/308
(58) Field of Classification Search .................... 348/308
See application file for complete search history.

(56) References Cited

U.S. PATENT DOCUMENTS

| | | | |
|---|---|---|---|
| 6,166,769 A * | 12/2000 | Yonemoto et al. | 348/308 |
| 6,248,991 B1 * | 6/2001 | Chen et al. | 250/208.1 |
| 6,483,541 B1 * | 11/2002 | Yonemoto et al. | 348/302 |
| 6,753,912 B1 * | 6/2004 | Wayne | 348/241 |
| 6,831,685 B1 * | 12/2004 | Ueno et al. | 348/243 |
| 6,853,241 B2 * | 2/2005 | Fujimoto | 330/9 |
| 7,046,238 B2 * | 5/2006 | Mabuchi | 345/204 |
| 7,880,778 B2 * | 2/2011 | Kamon | 348/241 |
| 2008/0019159 A1 * | 1/2008 | Song et al. | 363/62 |

* cited by examiner

*Primary Examiner* — Chieh M Fan
*Assistant Examiner* — Fayez Bhuiyan
(74) *Attorney, Agent, or Firm* — Robert D. Marshall, Jr.; Wade James Brady, III; Frederick J. Telecky, Jr.

(57) ABSTRACT

This invention is an amplification circuit which limits increased power consumption and circuit surface area use and an imaging device including this amplification circuit. After initially discharging a capacitor, a signal charge corresponding to the difference between pixel signals is transferred repeatedly to the capacitor during an integration phase storing a signal charge proportional to the number of repetitions. The output of amplification is the signal charge accumulated in the capacitor. The gain is independent of the capacitor capacitance ratio. Thus the capacitor size can be smaller than conventional amplification circuits.

11 Claims, 15 Drawing Sheets

AMPLIFYING CIRCUIT AND IMAGING DEVICE IMAGING DEVICE

CLAIM OF PRIORITY

This application claims priority under 35 U.S.C. 119(a) to Japanese Patent Application No. 2009-025714 filed Feb. 6, 2009.

TECHNICAL FIELD OF THE INVENTION

The technical field of this invention is an amplifying circuit that amplifies the difference between two signals in particular is an amplifying circuit that provides noise cancellation and amplification for signals output from an image sensor.

BACKGROUND OF THE INVENTION

Ordinary CMOS (complementary metal-oxide semiconductor) image sensors include a pixel array and a reading unit. A photodiode and an amplifier circuit are included for each pixel of the pixel array. The voltage generated by the photodiode is amplified by the amplifier circuit and output on a column signal line. The reading unit reads each pixel twice for noise cancelation processing. This is called correlated double sampling (CDS). The image signals at the dark level (N) and signal level (NS) are each read. The new pixel signal (S) is obtained from the difference of these signals (N-NS). Analog-digital conversion (ADC) is performed for pixel signal (S) following CDS for further image processing.

Each pixel is read using a technique combining a parallel system and a sequential system. Each row of the pixel array is selected in succession. Pixel signals are read in parallel from multiple columns in the selected row. The degree of parallelism changes according to the extent of read processing performed in each column. Table 1 shows the details of read processing performed in each column and the degree of parallelism.

TABLE 1

| Parallelism | N/NS memory | CDS | Signal amplification | AD conversion |
|---|---|---|---|---|
| Low | ○ | — | — | — |
| Moderate | ○ | ○ | ○ | — |
| High | ○ | ○ | ○ | ○ |

Improved parallelism improves performance while keeping power consumption low. This is because integration of pixels at the column level is strongly promoted when image sensor resolution is increased. In recent years, CMOS image sensors include an amplifying circuit for each column.

FIG. 26 shows an example of an ordinary switched capacitor amplifier that performs amplification and CDS of pixel signals in an image sensor of the prior art.

The amplifier shown in FIG. 26 has capacitors Ca and Cb, an operational amplifier 101 and a switch circuit 102. One terminal of capacitor Ca is connected to a column signal line of the image sensor and the other terminal is connected to the negative input terminal of operational amplifier 101. Capacitor Cb and switch circuit 102 are connected in parallel between the negative input terminal and the output terminal Vout of operational amplifier 101. Reference voltage GND is input to the positive input terminal of operational amplifier 101.

When dark level voltage Vn is output from the image sensor, switch circuit 102 is ON. The negative input terminal of operational amplifier 101 is held approximately at reference voltage GND so voltage Vn is supplied to capacitor Ca. The charge in capacitor Cb is cleared by switch circuit 102 being ON.

When signal level voltage Vns is output from the image sensor, switch circuit 102 goes OFF. The negative input terminal of operational amplifier 101 is held approximately at reference voltage GND, so voltage Vns is applied to capacitor Ca. When the voltage at capacitor Ca changes from Vn to Vns, a charge corresponding to the amount of voltage change is accumulated in capacitor Cb. The output voltage Vout of operational amplifier 101 is roughly represented by the following formula.

$$Vout = (Ca/Cb) \times (Vns - Vn) \qquad (1)$$

As shown in formula (1), the amplifier shown in FIG. 26 amplifies the difference between dark level and signal level (Vns-Vn) at a gain according to the capacitance ratio between capacitors Ca and Cb.

When an amplifier is provided for each column of the image sensor, variation in gain due to mismatching of electrostatic capacitance will be a problem.

Precision in matching of electrostatic capacitance is limited by masking processing. Even when relatively large capacitors are formed with the processes of recent years, the precision remains at around 0.1%. This precision is equal to a resolution of 10 bits. When a dark scene is photographed and additional signal amplification is performed outside the camera system, an error of 0.1% instantly produces visible noise. The noise accompanying variation in amplifier gain appears as a line running from the top to the bottom on the screen. When using a wide dynamic range technique to adaptively change the gain in each column, the problem of this noise becomes even more serious.

The minimum size of capacitor Cb is limited by both electrostatic capacitance matching precision and thermal noise. When high gain is required with the amplifier shown in FIG. 26, the size of capacitor Ca must be large. This creates a problem of the integrated circuit surface area becoming large. Capacitor Ca is divided into multiple unit capacitors to make gain programmable and a switch circuit to switch connections between them must be provided. This causes the surface area to become even larger. Therefore, the amplifier shown in FIG. 26 is unsuitable for a system with a high degree of parallelism where amplification is performed in each column of the image sensor.

Increasing the gain in the amplifier shown in FIG. 26 decreases the amount of feedback in operational amplifier 101. This causes further deterioration in the dynamic characteristics. The drive capability drops when the amount of feedback decreases, so the problem that operational amplifier 101 becomes unable to drive later-stage circuitry occurs. When the direct current gain of operational amplifier 101 is increased to broaden the gain bandwidth to avoid such problems, the problem that power consumption and circuit surface area increase is produced. Therefore, gain that can be achieved with the amplifier shown in FIG. 26 is actually limited to 8 times to 16 times. When higher gain is required, a separate amplifying stage will be provided, so increased power consumption and circuit surface area are unavoidable.

The present invention was devised in consideration of this situation, with the objective of providing an amplifying circuit with which increased power consumption and circuit surface area can be limited, and an imaging device provided with such an amplifying circuit.

SUMMARY OF THE INVENTION

The amplifying circuit pertaining to a first viewpoint of the present invention is an amplifying circuit that amplifies the difference between a first signal and second signal and has a first capacitor provided between a first node and a second node, a second capacitor provided between a third node and a fourth node, an input circuit that inputs the first signal or the second signal to the first node, a first switch circuit that connects the second node to a reference voltage, a second switch circuit that connects the second node to the third node, a current supply circuit that supplies current to the fourth node so that the voltage at the third node will approach the reference voltage, and a second capacitor discharge circuit that discharges the charge in the second capacitor. With the amplifying circuit in an initial phase, the second capacitor discharge circuit discharges the charge in the second capacitor. With the amplifying circuit in an integration phase, a first signal accumulation operation in which the first switch circuit is ON, the second switch circuit is OFF and the input circuit inputs the first signal to the first node. Following the first signal accumulation operation, a second signal accumulation operation in which the first switch circuit is OFF occurs, the second switch circuit being ON and the input circuit inputs the second signal to the first node are repeated a number of times corresponding to the amplification factor.

With the amplifying circuit in the initial phase, the charge in the second capacitor is discharged by the second capacitor discharge circuit.

With the first signal accumulation operation in the integration phase, the second node is connected to the reference voltage through the first switch circuit, and the first signal is input to the first node by the input circuit, so a charge corresponding to the first signal is accumulated in the first capacitor.

With the second signal accumulation operation following the first signal accumulation operation, the first switch circuit is OFF and the second switch circuit is ON, so the charge can move from the first capacitor to the second capacitor. In this instance, the second signal is input to the first node by the input circuit also being supplied to the fourth node so that the voltage at the third node will approach the reference voltage, so a charge corresponding to the second signal is accumulated in the first capacitor. In addition, a charge corresponding to the difference between the first signal and the second signal is transferred to the second capacitor from the first capacitor.

A charge corresponding to the difference between the first signal and the second signal is accumulated in the second capacitor by the first signal accumulation operation and the second signal accumulation operation being repeated. The amount of the accumulated charge increases by the number of the repetitions being increased.

Ideally, the amplifying circuit could also have a third switch circuit that connects the fourth node to the current output terminal of the current supply circuit, a fourth switch circuit that connects the fourth node to the reference voltage, a fifth switch circuit that connects the first node to the current output terminal of the current supply circuit, and a first capacitor discharge circuit that discharges the charge in the first capacitor. Then, with the circuit, in the integration phase, the fourth switch circuit and the fifth switch circuit could be OFF. In at least the second signal accumulation operation in the integration phase, the third switch circuit could be ON. In a discharge phase after the integration phase, the first capacitor discharge circuit could discharge the charge in the first capacitor. In a charge transfer phase after the discharge phase, the first switch circuit and the third switch circuit could be OFF, the second switch circuit, the fourth switch circuit and the fifth switch circuit could be ON, and the current supply circuit could supply current to the first node so that the voltage at the third node will approach the reference voltage.

With the amplifying circuit, in the discharge phase after the integration phase, the charge in the capacitor is discharged by the first capacitor discharge circuit. Then, in the charge transfer phase after the discharge phase, the first switch circuit is OFF and the second switch circuit is ON, so the charge can move from the second capacitor to the first capacitor. In this instance, when the third switch circuit is OFF, the fifth switch circuit is ON, and current is supplied to the first node so that voltage at the third node will approach the reference voltage, the charge is transferred from the second capacitor to the first capacitor so that the voltage at the third node will approach the reference voltage. The fourth switch circuit is ON, so approximately all the charge accumulated in the second capacitor is transferred to the first capacitor.

Ideally, the amplifying circuit could also have a third capacitor provided between a fifth node and the second node, and a sixth switch circuit that connects the fifth node to the current output terminal. The current supply circuit could also output current corresponding to the voltage difference between the voltage at the fifth node and the reference voltage. In this case, in the initial phase, the second switch circuit and the fifth switch circuit could be OFF and the first switch circuit and the sixth switch circuit could be ON, and in the second signal accumulation operation in the integration phase and the charge transfer phase, the sixth switch circuit could be OFF.

Ideally, the amplifying circuit could also have a seventh switch circuit that connects the fifth node to the third node. In this case, in the first signal accumulation operation in the integration phase, the third switch circuit and the seventh switch circuit could be ON, and the sixth switch element could be OFF. In the second signal accumulation operation in the integration phase, the third switch circuit could be ON, and the sixth switch circuit and the seventh switch circuit could be OFF. In the discharge phase, the third switch circuit and the seventh switch circuit could be ON, and the sixth switch circuit could be OFF. In the charge transfer phase, the third switch circuit, the sixth switch circuit, and the seventh switch circuit could be OFF.

Ideally, with the amplifying circuit, in the initial phase, the third switch circuit could be OFF, and the fourth switch circuit and the seventh switch circuit could be ON. In this case, the fourth switch circuit, the seventh switch circuit and the sixth switch circuit, which form a conduction path in the initial phase, and the current supply circuit, which supplies discharge current to the conduction path, could also operate as the second capacitor discharge circuit.

Ideally, the amplifying circuit could also have an eighth switch circuit that connects a sixth node shared by the first switch circuit and the third capacitor to the second node, and a ninth switch circuit that connects the fifth node to the second node. In this case, in the initial phase, the integration phase, the discharge phase and the charge transfer phase, the eighth switch circuit could be ON, and the ninth switch circuit could be OFF. In a correction phase after the charge transfer phase, the first switch circuit, the fifth switch circuit and the ninth switch circuit could be ON, and the second switch circuit, the third switch circuit, the sixth switch circuit, the seventh switch circuit, and the eighth switch circuit could be OFF.

Ideally, the first capacitor could also comprise multiple unit capacitors connected in parallel. In this case, the amplifying circuit could also have a selection circuit that selects at least some of the multiple unit capacitors according to a gain setting signal, and that connects the selected unit capacitors between the first node and the second node, in the charge transfer phase.

Ideally, the input circuit could also input the first signal, the second signal, a first reference signal or a second reference signal to the first node. In this case, with the amplifying circuit, in the integration phase, a first reference signal accumulation operation in which the first switch circuit is ON, the second switch circuit is OFF, and the input circuit inputs the first reference signal to the first node, and following the first reference signal accumulation operation, a second reference signal accumulation operation in which the first switch circuit is OFF, the second switch circuit is ON, and the input circuit inputs the second reference signal to the first node, could be repeated a number of times corresponding to the amplification factor.

Ideally, the amplifying circuit could also have a tenth switch circuit that connects the first node to the reference voltage, and in the discharge phase, the first switch circuit and the tenth switch circuit could be ON. In this case, the first switch circuit and the tenth switch circuit, which form a conduction path in the discharge phase, could operate as the first capacitor discharge circuit.

Ideally, the amplifying circuit could also have a hold circuit that holds the first signal and the second signal, each of which is generated at a prescribed timing.

The imaging device pertaining to a second viewpoint of the present invention is provided with a pixel array comprising multiple pixel circuits arranged in a matrix form, a pixel scan circuit that successively selects each row of the pixel array and outputs a first signal corresponding to noise level and a second signal corresponding to imaging level from each of the N pixel circuits belonging to the selected row, and N of the aforementioned amplifying circuits, each of which amplifies the difference between the first signal and the second signal output from the N pixel circuits.

With the present invention, amplification is performed by repetitive accumulation in capacitors of a charge corresponding to the difference between two signals which are input, so increased power consumption and circuit surface area can be limited.

BRIEF DESCRIPTION OF THE DRAWINGS

These and other aspects of this invention are illustrated in the drawings, in which.

DETAILED DESCRIPTION OF PREFERRED EMBODIMENTS

In the Figures: 1 is a pixel array; 10 is a pixel circuit; 2 is a vertical scan circuit; 3 is a read processing circuit; 4 is a control circuit; 21 is a pulse shift circuit; 31-1 to 31-$j$ are signal hold circuits; 32, 32A, 32B, 32C, 32D and 32-1 to 32-$j$ are read circuits; 33 is a serial conversion circuit; 34 is an analog-digital conversion circuit; 301 and 302 are buffer circuits; 303 is a switch circuit; 304 is a current source; 305 and 306 are operational amplifiers; C1 to C3, CM1 to CMj and CMA1 to CMAj are capacitors; SW1 to SW13 are switch circuits; PD is a photodiode; Q1 to Q4 are MOS transistors; LR1 to LRi are row signal lines; and LC1 to LCj are column signal lines.

Figure 1:
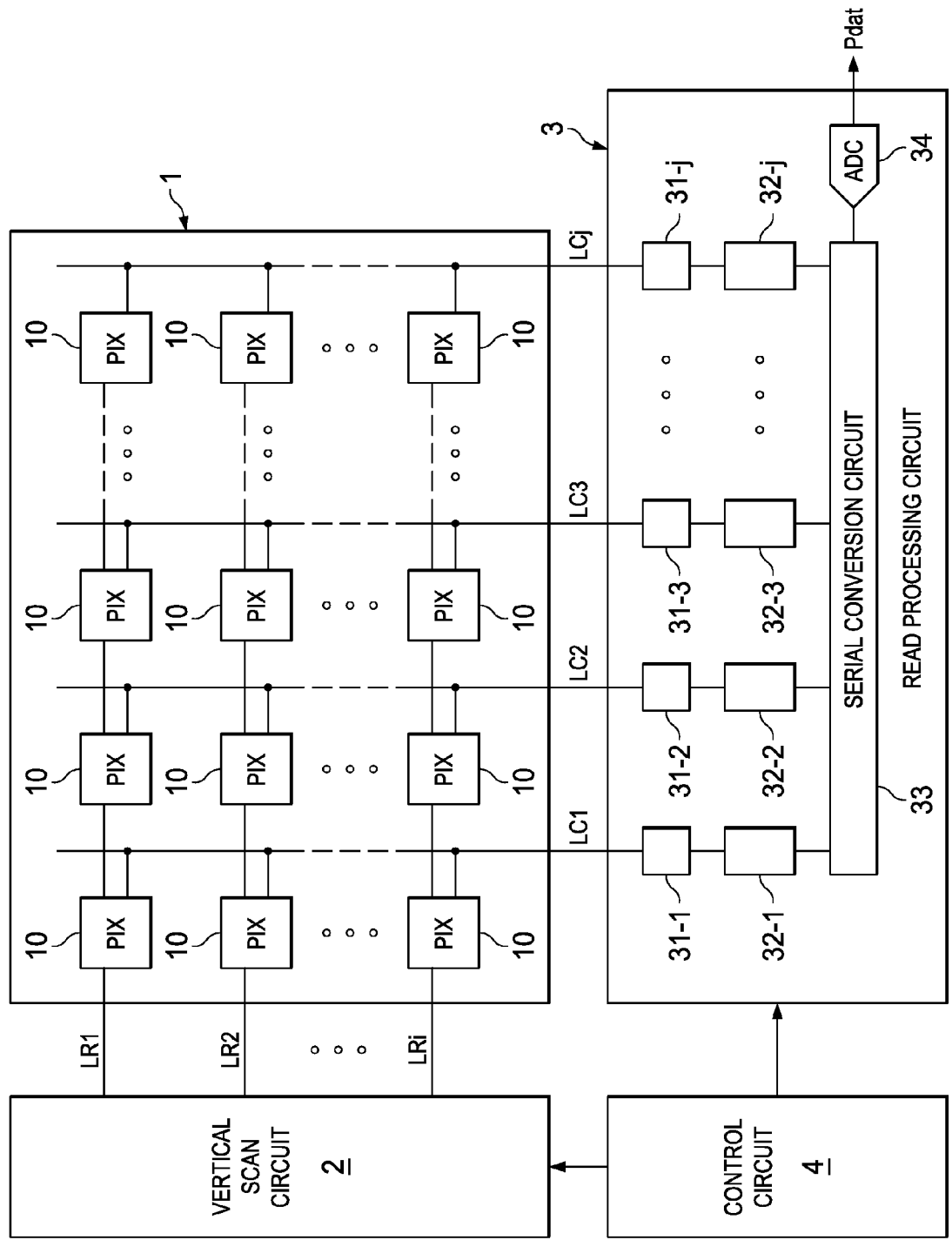
FIG. 1 shows an example of the configuration of an imaging device pertaining to a first embodiment.

FIG. 1 shows an example of the configuration of an imaging device pertaining to a first embodiment of the present invention. The imaging device pertaining to this embodiment has a pixel array 1, a vertical scan circuit 2, a read processing circuit 3, and a control circuit 4.

Pixel array 1 is an embodiment of the pixel array in the present invention.

Vertical scan circuit 2 is an embodiment of the pixel scan circuit in the present invention.

Pixel array 1 has multiple pixel circuits 10 that convert light from photographed subjects to electrical signals. Pixel circuits 10 are arranged in a matrix form, and are connected to common row signal lines LR1, LR2, . . . in each row, and are connected to common column signal lines LC1, LC2, . . . in each column.

Figure 2:
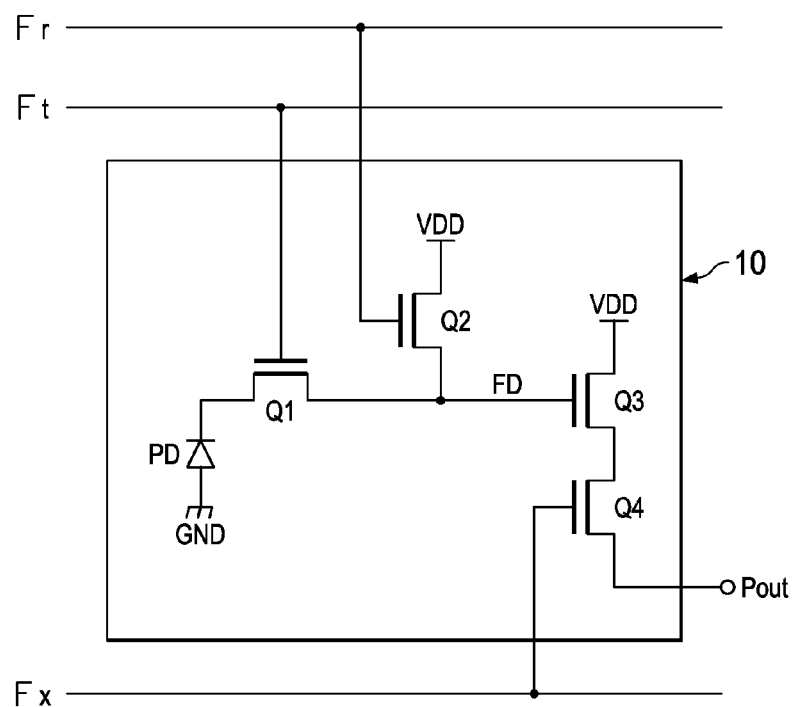
FIG. 2 shows an example of the configuration of a pixel circuit.

FIG. 2 shows an example of the configuration of pixel circuit 10. A pixel circuit 10 has a photodiode PD that receives light from a photographed subject to generate a light charge, and n-type MOS transistors Q1 to Q4.

The anode of photodiode PD is connected to reference voltage GND, and the cathode is connected to a floating region FD through MOS transistor (transfer transistor) Q1. MOS transistor (reset transistor) Q2 is connected between power line VDD and floating region FD. The gate of MOS transistor (amplifying transistor) Q3 is connected to floating region FD, the drain is connected to power line VDD, and the source is connected to output Pout through MOS transistor (selection transistor) Q4. Control signals φt, φr and φx are input through the row signal lines (LR1, LR2, . . . ) to the gates of MOS transistors Q1, Q2 and Q4. The pixel signals generated in pixel circuits 10 are output to the column signal lines (LC1, LC2, . . . ) from output Pout.

Pixel circuits 10 shown in FIG. 2 operate as below.

When a new field is entered, transfer transistor Q1 and reset transistor Q2 are set to OFF, and an accumulation period is started. In the accumulation period, a light charge generated according to light from a photographed subject is accumulated in photodiodes PD.

When the accumulation period ends, transfer transistor Q1 is set to OFF, and reset transistor Q2 is ON. The charge in floating region FD is reset by this. In the reset mode, the output signal from amplifying transistor Q3 is read as reset level signal N.

After the charge in floating region FD is reset, transfer transistor Q1 is ON, and reset transistor Q2 to OFF. The light charge accumulated in photodiode PD is transferred to floating region FD, which is in reset mode, by this. After light charge transfer, transfer transistor Q1 is again set to OFF. With the light charge transferred to floating region FD, the output signal from amplifying transistor Q3 is read as pixel signal NS. Pixel signal NS includes a component for the light charge accumulated in the capacitance of photodiode PD, and a component for reset level signal N. A pixel signal S in which the noise portion of the reset level has been canceled is obtained by subtracting reset level signal N from pixel signal NS.

When one field ends in this way, the same operation is repeated in the next field. When signals (N, NS) are read in read processing circuit 3, control signal φx is set to high level, and selection transistor Q4 is ON.

Vertical scan circuit 2 successively selects pixel rows and columns in pixel array 1 one row at a time, and outputs the pixel signals in pixel circuits 10 that belong to a selected row to the respective column signal lines LC1, LC2, . . . .

Figure 3:
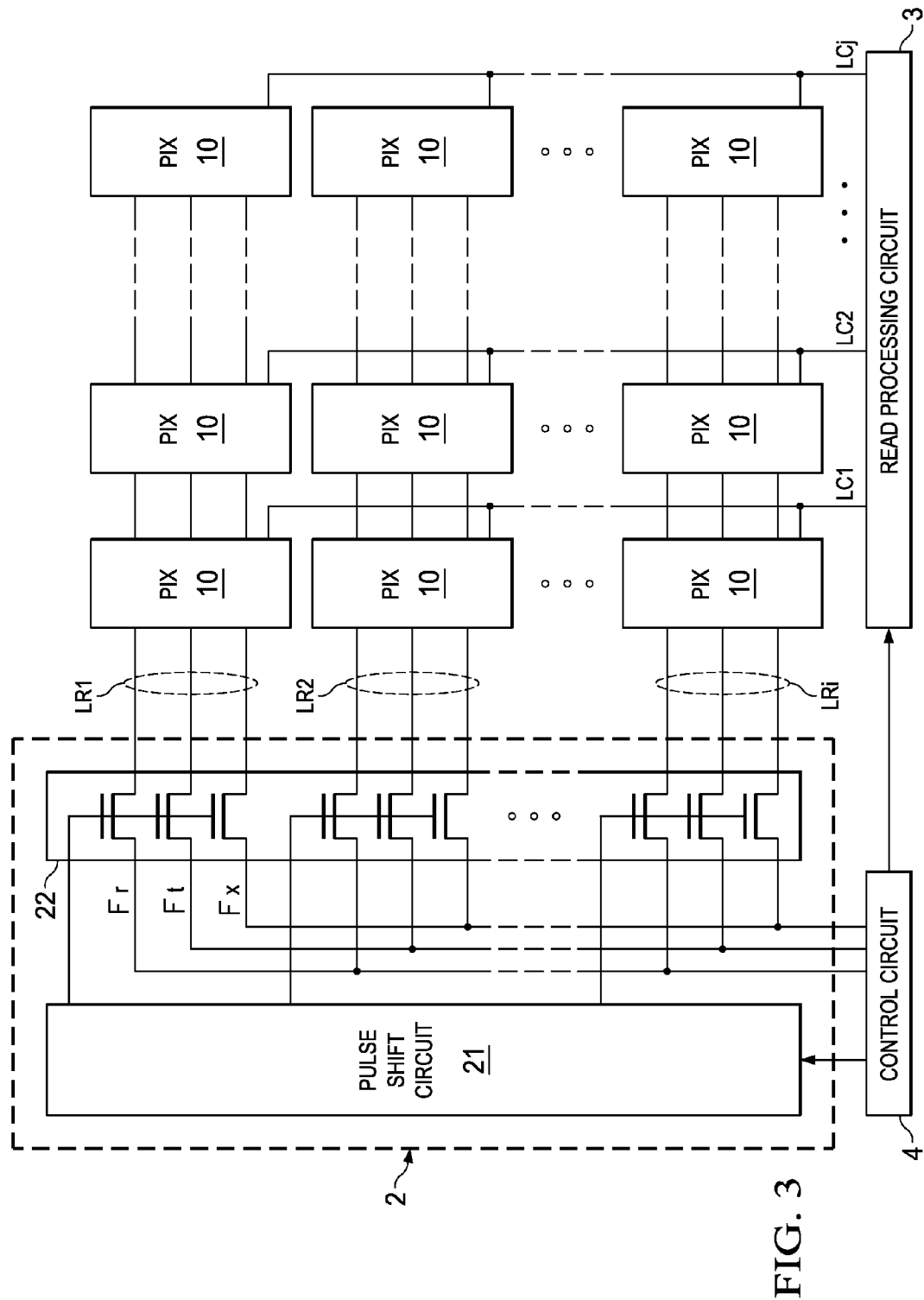
FIG. 3 shows an example of the configuration of a vertical scan circuit.

FIG. 3 shows an example of the configuration of vertical scan circuit 2. Vertical scan circuit 2 shown in FIG. 3 has a pulse shift circuit 21 and a switch circuit 22.

Pulse shift circuit 21 generates pulse signals that are successively shifted according to control signals (start signal, vertical scan lock signal, etc.) generated by control circuit 4. Pulse shift circuit 21 is configured with a shift register, for example.

Switch circuit 22 connects the control signal lines (φr, φt, φx) of pixel circuits 10 to any one of row signal lines LR1 to LRi corresponding to the pulse signal of pulse shift circuit 21. Switch circuit 22 is configured with a transistor that turns ON and OFF according to the pulse signal from pulse shift circuit 21, as shown in FIG. 3, for example.

Read processing circuit 3 reads pixel signals from one row of pixel circuits 10 in pixel array 1 selected successively by vertical scan circuit 2, and applies processing, such as CDS, amplification, and AD conversion, to the pixel signals that are read to generate pixel data Pdat.

Read processing circuit 3 has signal hold circuits 31-1 to 31-*j*, read circuits 32-1 to 32-*j*, a serial conversion circuit 33, and an analog-digital conversion circuit 34, as shown in FIG. 1, for example.

Signal hold circuit 31-*k* (k represents any integer from 1 to j) holds reset level signal N and pixel signal NS read from pixel circuit 10 through a column hold line LCk.

Figure 4:
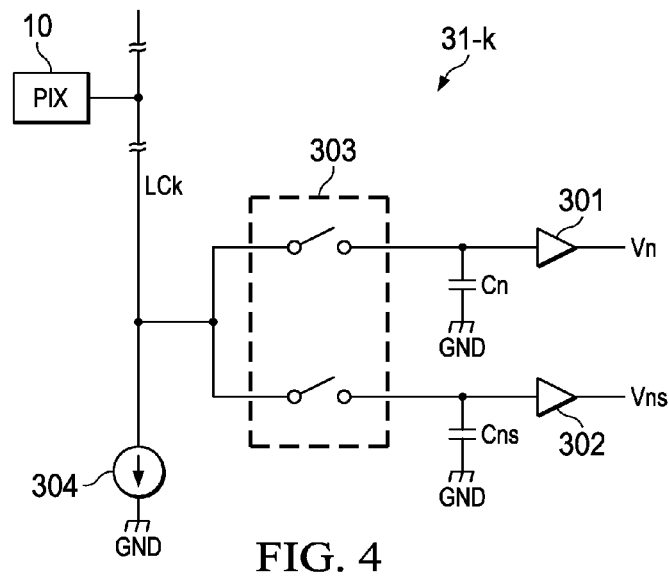
FIG. 4 shows an example of the configuration of a signal hold circuit.

FIG. 4 shows an example of the configuration of signal hold circuit 31-*k*. Signal hold circuit 31-*k* shown in FIG. 4 has capacitors Cn and Cns, buffer circuits 301 and 302, a switch circuit 303, and a current source 304.

Current source 304 is connected to the output of pixel circuit 10 through column hold line LCk, and sends a constant current to the source of amplifying transistor Q3 (FIG. 2).

One terminal of capacitors Cn and Cns is connected to reference voltage GND, and the other terminal is connected to column signal line LCk through switch circuit 303. Switch circuit 303 selectively connects capacitors Cn and Cns and column signal line LCk in response to control by control circuit 4.

During the period when reset level signal N is output from pixel circuits 10, capacitor Cn and column signal line LCk are connected. During the period when pixel signal NS is output, capacitor Cns and column line signal LCk are connected. Reset level signal N is held in capacitor Cn by this, and voltage Vn corresponding to it is output from buffer circuit 301. Pixel signal NS is held in capacitor Cns. A voltage Vns corresponding to pixel signal NS is output from buffer circuit 302.

Read circuit 32-*k* accepts input of reset level signal N and pixel signal NS held in signal hold circuit 31-*k*, and amplifies and outputs the difference.

Figure 5:
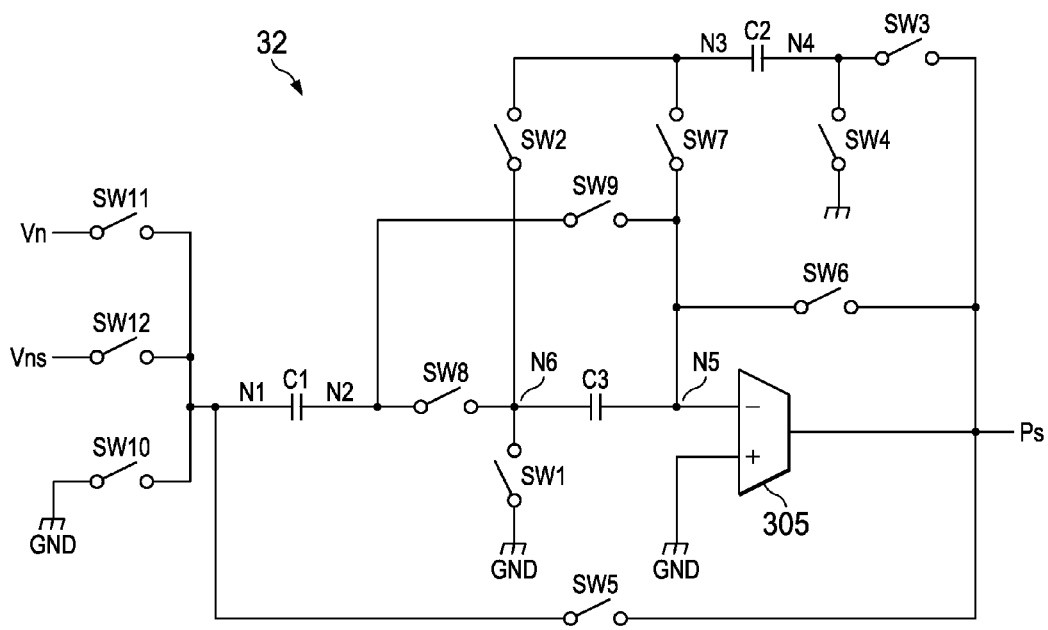
FIG. 5 shows an example of the configuration of a read circuit.

FIG. 5 shows an example of the configuration of read circuit 32-*k*. Note that read circuit 32-*k* may be represented with the symbol '32'.

In the example in FIG. 5, read circuit 32 has switch circuits SW1 to SW12, capacitors C1-C3, and an operational amplifier 305.

Capacitor C1 is an embodiment of the first capacitor in the present invention.

Capacitor C2 is an embodiment of the second capacitor in the present invention.

The circuit that includes switch circuits SW11 and SW12 is an embodiment of an input circuit in the present invention.

Switch circuits SW1-SW10 are examples of the first through tenth switch circuits in the present invention.

Operational amplifier 305 is an embodiment of the current supply circuit in the present invention.

Switch circuit SW11 inputs reset level signal N (voltage Vn) held in signal hold circuit 31-*k* to node N1.

Switch circuit SW12 inputs pixel signal NS (voltage Vns) held in signal hold circuit 31-*k* to node N1.

Switch circuit SW10 connects node N1 to reference voltage GND.

Capacitor C1 is provided between node N1 (first node) and node N2 (second node).

Capacitor C2 is provided between node N3 (third node) and node N4 (fourth node).

Switch circuit SW8 connects node 6 (sixth node) to node N2.

Switch circuit SW1 connects node N6 to reference voltage GND. When switch circuit SW8 is ON, switch circuit SW1 connects node N2 to reference voltage GND.

Switch circuit SW2 connects node N6 to node N3. When switch circuit SW8 is ON, switch circuit SW2 connects node N2 to node N3.

Operational amplifier 305 generates current according to the voltage difference between a positive input terminal input to reference voltage GND and a negative input terminal connected to node N5 (fifth node), and outputs it to output terminal Ps. Operational amplifier 305 is an OTA (operational transconductance amplifier), for example, the gain (transconductance) of which is very large. For this reason, voltage at node N5 will be approximately equal to reference voltage GND by the action of negative feedback of current supplied to node N4 from operational amplifier 305.

Capacitor C3 is provided between node N5 and node N6.

Switch circuit SW6 connects node N5 to the current output terminal Ps of operational amplifier 305

Switch circuit SW7 connects node N5 to node N3.

Switch SW9 connects node N5 to node N2.

Switch circuit SW4 connects node N4 to reference voltage GND.

Switch circuit SW3 connects node N4 to the current output terminal Ps of operational amplifier 305.

Switch circuit SW5 connects the current output terminal Ps of operational amplifier 305 to node N1.

With read circuit 32 shown in FIG. 5, by charge corresponding to the difference (Vn−Vns) between reset level signal N (voltage Vn) and pixel signal NS (voltage Vns) being transferred repeatedly from capacitor C1 to capacitor C2, a signal charge which has been integrated according to the number of repetitions is accumulated in capacitor C2. Accurate gain that is not dependent on the capacitance of capacitors C1 and C2 is obtained by returning the signal charge accumulated in capacitor C2 to capacitor C1.

Detailed operation by read circuit 32 is explained later by referring to FIGS. 7 to 12.

Serial conversion circuit 33 converts pixel signals output in parallel from the read circuits (32-1 to 32-j) to a serial signal string.

Figure 6:
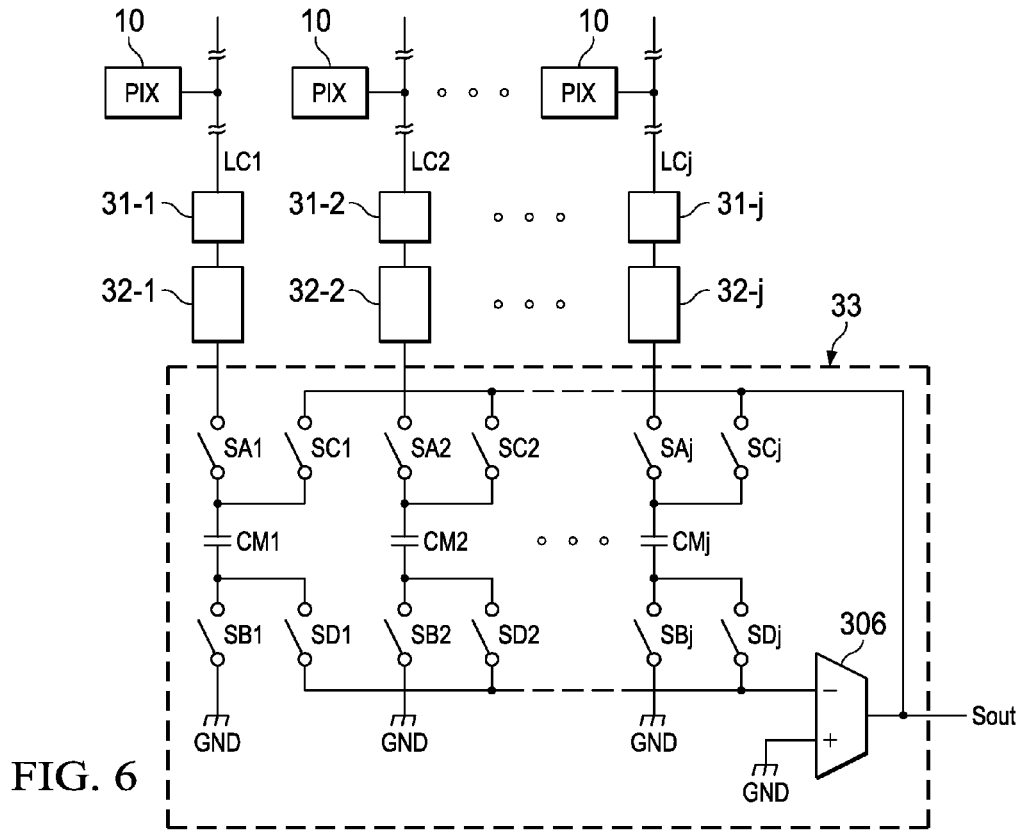
FIG. 6 shows an example of the configuration of a serial conversion circuit.

FIG. 6 shows an example of the configuration of serial conversion circuit 33.

Serial conversion circuit 33 shown in FIG. 6 has capacitors CM1-CMj provided at the outputs of read circuits 32-1 to 32-j, switch circuits SA1 to SAj, SB1 to SBj, SC1 to SCj and SD1 to SDj, and an OTA or other operational amplifier 306.

Capacitor CMk (k=1-j) holds pixel signal Ps output from read circuit 32-k. One terminal of capacitor CMk is connected to the output of read circuit 32-k through switch circuit SAk, and is also connected to the output of operational amplifier 306 through switch circuit SCk. The other terminal of capacitor CMk is connected to reference voltage GND through switch circuit SBk and is also connected to the negative input terminal of operational amplifier 306 through switch circuit SDk. The positive input terminal of operational amplifier 306 is connected to reference voltage GND.

In the period when amplified pixel signals Ps are output from read circuits 32-1 to 32-j, switch circuits SA1 to SAj and SB1 to SBj are all ON, and switch circuits SC1 to SCj and SD1 to SDj are all OFF. Pixel signals Ps output from read circuits 32-1 to 32-j are held by capacitors CM1 to CMj, respectively, by this.

When the output period for pixel signals Ps ends, switch circuits SA1 to SAj and SB1 to SBj all go OFF, and switch circuits SC1 to SCj and SD1 to SDj successively come ON. Switch pairs successively turn ON in the situation of switch circuits SC1 and SD1, SC2 and SD2, SC3 and SD3, . . . . When one pair turns ON, another pair turns OFF. When a pair of switch circuits comes ON in succession, capacitors CM1 to CMj are connected one at a time in succession between the negative input terminal and the output terminal Sout of operational amplifier 306. Due to the action of negative feedback, the negative input terminal of operational amplifier 306 will be approximately equal to reference voltage GND, so at the output terminal Sout of operational amplifier 306, voltage approximately equal to the voltage in the capacitor (CM1 to CMj) connected at that time is generated. In this way, pixel signals Ps held in capacitors CM1 to CMj are output serially from operational amplifier 306.

Analog-digital conversion circuit 34 converts pixel signal Sout output serially from serial conversion circuit 33 to a digital signal with a prescribed bit length, and outputs it as pixel data Pdat.

Control circuit 4 generates control signals for controlling the individual components of the imaging device.

For example, control circuit 4 generates control signals ϕt, ϕr, ϕx) for generated pixel signals in pixel circuits 10, control signals for successively selecting each row in pixel array by vertical scan circuit 2, control signals for holding the signals (N, NS) from pixel circuits 10 by signal hold circuits 31-1 to 31-j, control signals to supply [the previous signals] to the switch circuits (SW1-SW12) with read circuits 32-1 to 32-j, controls signals for obtaining a serial signal string with serial conversion circuit 33, etc.

Here, the operation of an imaging device that has the configuration described above will be explained in detail concentrating on read circuit 32.

The row signal lines (LR1, . . . LRj) are successively activated as a result of scanning by vertical scan circuit 2. When a row signal line is activated, the pixel signals (N, NS) from the pixel circuits 10 in the one line (one line) connected to it are output. The pixel signals are input to read processing circuit 3 through the column signal lines (LC1 to LCj) and are held in signal hold circuits 31-1 to 31-j. When one line of pixel signals N and NS are held in signal hold circuits 31-1 to 31-j, operation to amplify the difference (NS−N) between the pixel signals is started in read circuits 32-1 to 32-j.

With read circuit 32, the amplification operation proceeds in steps with multiple phases (initial phase, integration phase, discharge phase, charge transfer phase, correction phase).

1. Initial Phase (FIG. 7)

In the initial phase, the charge in capacitor C2 is initialized.

Figure 7:
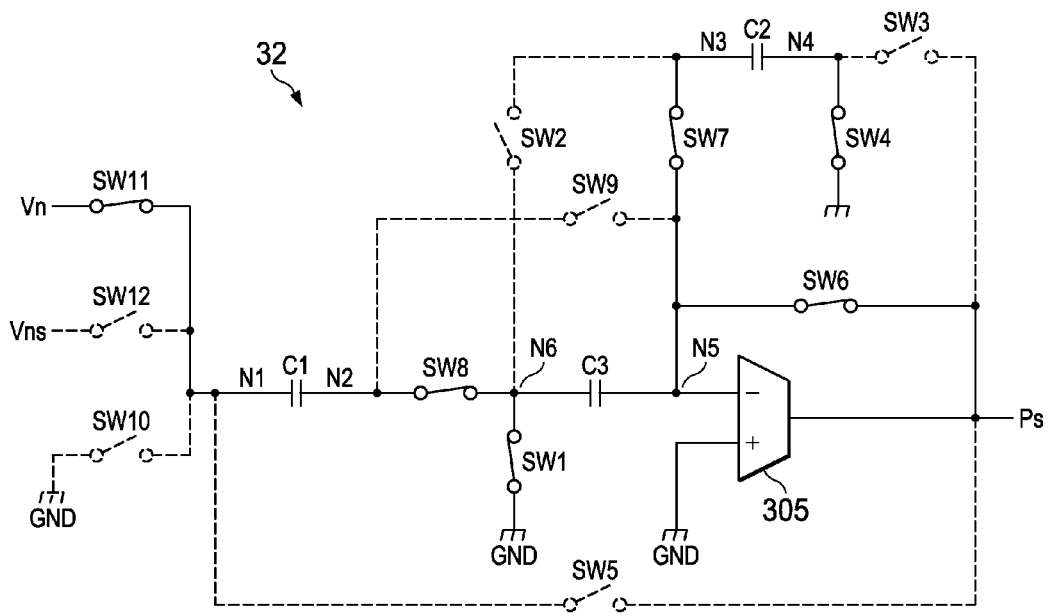
FIG. 7 shows an example of the read circuit of FIG. 5 connected in the initial phase.

FIG. 7 shows an example of read circuit 32 connected in the initial phase.

The ON or OFF state of each switch in the initial phase is as follows.

ON: SW1, SW4, SW6, SW7, SW8, SW11

OFF: SW2, SW3, SW5, SW9, SW10, SW12

In the initial phase, the output terminal of operational amplifier 305 is connected to the negative input terminal through switch circuit SW6, and capacitors C2 and C3 are connected between the negative input terminal and the positive input terminal. The voltages at the negative input terminal and the positive input terminal will be approximately equal due to the action of negative feedback, but because operational amplifier 305 has a finite direct current gain, a minute offset voltage Vofs is held in capacitors C2 and C3.

In the initial phase, the output terminal Ps of operational amplifier 305 is connected to the negative input terminal through switch circuit SW6, and capacitors C2 and C3 are connected between the negative input terminal and the positive input terminal. The voltages at the negative input terminal and the positive input terminal will be approximately equal due to the action of negative feedback, but because operational amplifier 305 has a finite direct current gain, a minute offset voltage Vofs is held in capacitors C2 and C3.

Figure 8:
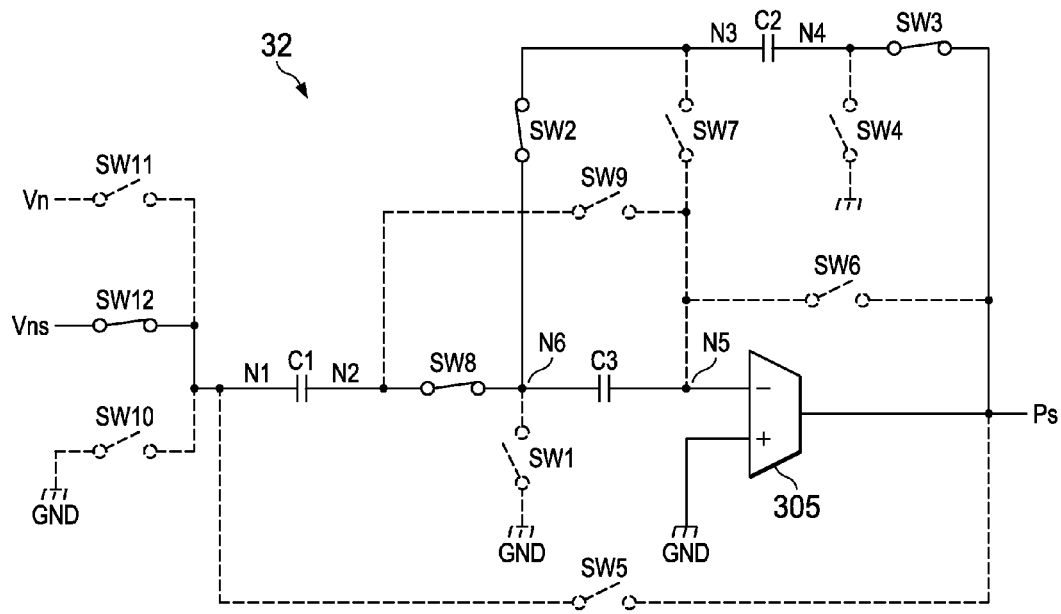
FIG. 8 shows an example of the read circuit of FIG. 5 connected in the second signal accumulation operation.
Figure 9:
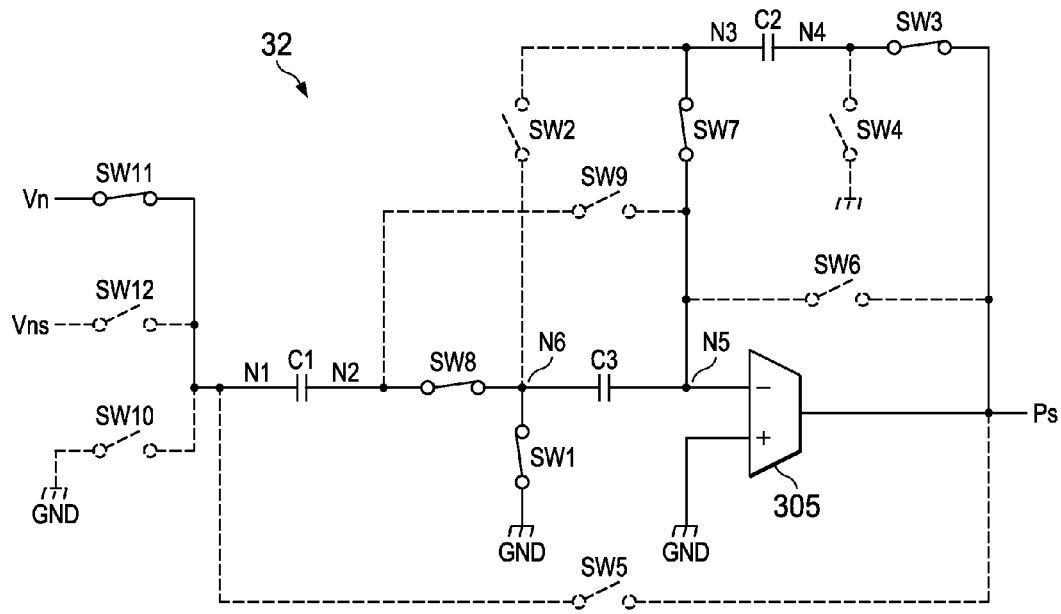
FIG. 9 shows an example of the read circuit of FIG. 5 connected in the first signal accumulation operation.

2. Integration Phase (FIG. 7, FIG. 8, FIG. 9)

In the integration phase, by charge (hereafter called 'signal charge') corresponding to the difference (Vn−Vns) between reset level signal N and pixel signal NS being transferred repeatedly from capacitor C1 to capacitor C2, a signal charge that is integrated according to the number of repetitions is accumulated in capacitor C2.

In concrete terms, the set of first signal accumulation operation and second signal accumulation operation described next is repeated according to the amplification factor (gain).

That is, with the first signal accumulation operation, charge corresponding to reset level signal N (voltage Vn) is accumulated in capacitor C1.

With the second signal accumulation operation following the first signal accumulation operation, charge corresponding to pixel signal NS (voltage Vns) is accumulated in capacitor C1, and a signal charge corresponding to the difference (Vn−Vns) is also transferred from capacitor C1 to capacitor C2.

First, the initial first signal accumulation operation in the integration phase is performed simultaneously with the initial phase in the connection mode shown in FIG. 7 described above. In this instance, voltage 'C1×Vn' corresponding to reset level signal N is accumulated in capacitor C1. ('C1' also represents the electrostatic capacitance of capacitor C1. The same holds for capacitors C2 and C3.)

Following the first signal accumulation operation performed simultaneously with the initial phase, the second signal accumulation operation is performed.

FIG. 8 shows an example of read circuit 32 connected in the second signal accumulation operation.

The ON or OFF state of each switch in the second signal accumulation operation is as follows.
ON: SW2, SW3, SW8, SW12
OFF: SW1, SW4, SW5, SW6, SW7, SW9, SW10, SW11

With the second signal accumulation operation, pixel signal (voltage Vns) is input to node N1, the output terminal Ps of operational amplifier 305 is connected to node N2 through capacitor C2, and node N5 is connected to node N2 through capacitor C3.

In this instance, offset voltage Vofs occurring at the negative input terminal (node N5) of operational amplifier 305 and the voltage held in capacitor C3 in the first signal accumulation operation are approximately equal, so the two voltages cancel out, and the voltage at node N2 will be approximately equal to reference voltage GND.

Because the voltage at node N2 is approximately equal to reference voltage GND, a charge 'C1×Vns' is accumulated in capacitor C1. Charge 'C1×Vn' was accumulated in capacitor C1 in the immediately preceding first signal accumulation operation, so a differential signal charge 'C1(Vn−VnS)' is transferred from capacitor C1 to capacitor C2.

Offset voltage Vofs at operational amplifier 305 is canceled by the voltage held in capacitor C3, so error produced by offset voltage Vofs when charge is transferred from capacitor C1 to capacitor C2 is approximately canceled.

Relating to the effect of the finite direct current gain of operational amplifier 305, error is present due to the fact that the output voltage of operational amplifier 305 changes accompanying integration of the signal charge. However, because the direct current gain of operational amplifier 305 is approximately constant in the signal range, the error is proportional to the integration result, so it becomes a constant gain error. For this reason, there is not much of a problem in the image sensor.

Following the second signal accumulation operation described above, the second and subsequent first signal accumulation operations are performed using the connection status shown in FIG. 9.

The ON or OFF state of each switch in the second and subsequent first signal accumulation operations is as follows.
ON: SW1, SW3, SW7, SW8, SW11
OFF: SW2, SW4, SW5, SW6, SW9, SW10, SW12

In the first signal accumulation operation shown in FIG. 9, reset level signal N (voltage Vn) is input to node N1, and node N2 is connected to reference voltage GND, so reset level signal N (voltage Vn) is held in capacitor C1.

With the first signal accumulation operation shown in FIG. 9. the output terminal Ps of operational amplifier 305 is connected to node N5 through capacitor C2, and node N5 is connected to reference voltage GND through capacitor C3. In this instance, the voltage held in capacitor C3 and offset voltage Vofs occurring at node N5 are approximately equal, so the amount of charge in capacitor C3 does not change from the value in the immediately preceding second signal accumulation operation. Therefore, the amount of charge in capacitor C3 connected in series with capacitor C2 is also kept approximately the same.

In the second signal accumulation operation, the connection point of node N3 changes from reference voltage GND to node N5, so the output voltage (Ps) of operational amplifier 305 shifts by the amount of offset voltage Vofs.

3. Discharge Phase (FIG. 10)

In the discharge phase, the charge accumulated in capacitor C1 in the last second signal accumulation operation of the integration phase is discharged.

Figure 10:
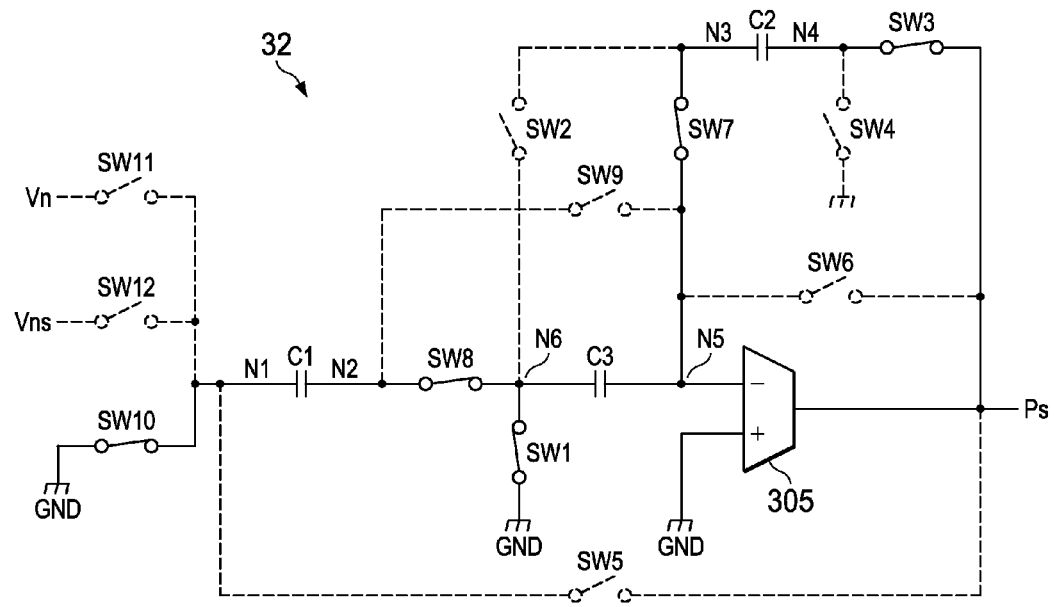
FIG. 10 shows an example of the read circuit of FIG. 5 connected in the discharge phase.

FIG. 10 shows an example of read circuit 32 connected in the discharge phase.

The ON or OFF state of each switch circuit in the discharge phase is as follows.
ON: SW1, SW3, SW7, SW8, SW10
OFF: SW2, SW4, SW5, SW6, SW9, SW11, SW12

In the discharge phase, node N1 and node N2 are connected to reference voltage GND, so the charge accumulated in capacitor C1 in the integration phase is discharged.

In addition, in the discharge phase, the output terminal Ps of operational amplifier 305 is connected to node N5 through capacitor C2, and node N5 is connected to reference voltage GND through capacitor C3, the same as the first signal accumulation operation shown in FIG. 9, so the charge in capacitor C2 is kept constant.

4. Charge Transfer Phase (FIG. 11)

In the charge transfer phase, the integrated charge in capacitor C2 is transferred to capacitor C1.

Figure 11:
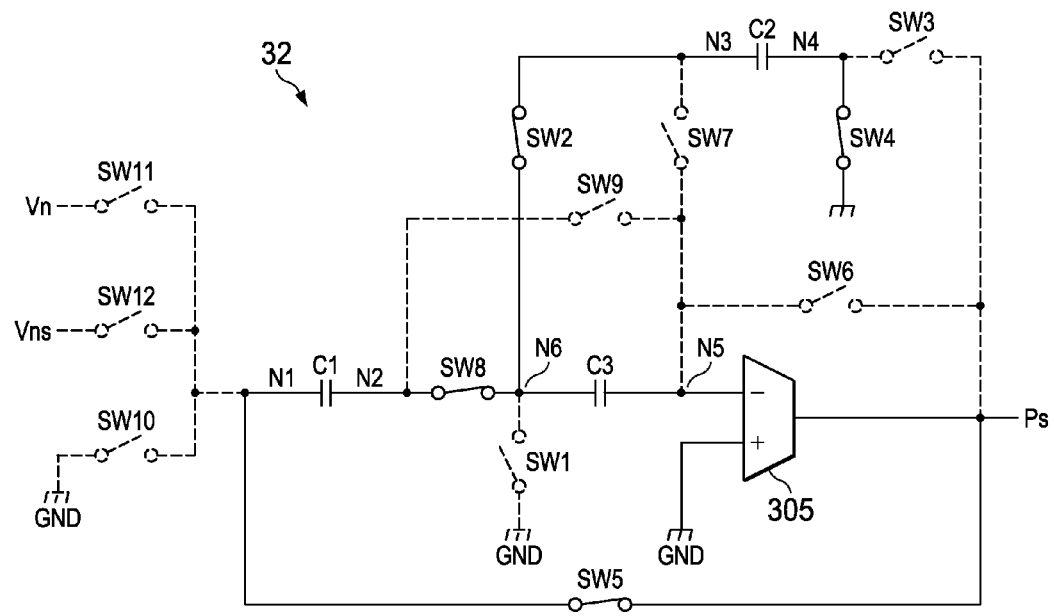
FIG. 11 shows an example of the read circuit of FIG. 5 connected in the charge transfer phase.

FIG. 11 shows an example of read circuit 32 connected in the charge transfer phase.

The ON or OFF state of each switch circuit in the charge transfer phase is as follows.
ON: SW2, SW4, SW5, SW8
OFF: SW1, SW3, SW6, SW7, SW9, SW10, SW11, SW12

In the charge transfer phase, the output terminal Ps of operational amplifier 305 is connected to node N2 through capacitor C1, node N5 is connected to node N2 through capacitor C3, and node N2 is connected to reference voltage GND through capacitor C2. In this case, negative feedback works so that the voltage at node N2 is approximately equal to reference voltage GND, so the voltage at capacitor C2 will be zero, and the charge accumulated in capacitor C2 is all transferred to capacitor C1.

When one set of the first signal accumulation operation and the second signal accumulation operation have been performed, voltage 'C1×(Vn−Vns)' is accumulated in capacitor C2. Therefore, when the operations are repeated for K sets, charge Qs represented by the following formula is accumulated in capacitor C2.

$$Qs = KC1 \times (Vn - Vns) \qquad (2)$$

When charge Qs is returned to capacitor C1 again, voltage Vc1 generated at capacitor C1 is represented with the following formula $$Vc1 = Qs/C1 = Kx(Vn-Vns) \quad (3)$$

As shown in formula (3), voltage Vc1 of capacitor C1 is proportional to the number of operations K of the accumulation operations and does not depend on the electrostatic capacitance of capacitors C1 and C2.

5. Correction Phase (FIG. 12)

In the correction phase, the offset voltage Vofs component included in voltage Vc1 of capacitor C1 is corrected.

Figure 12:
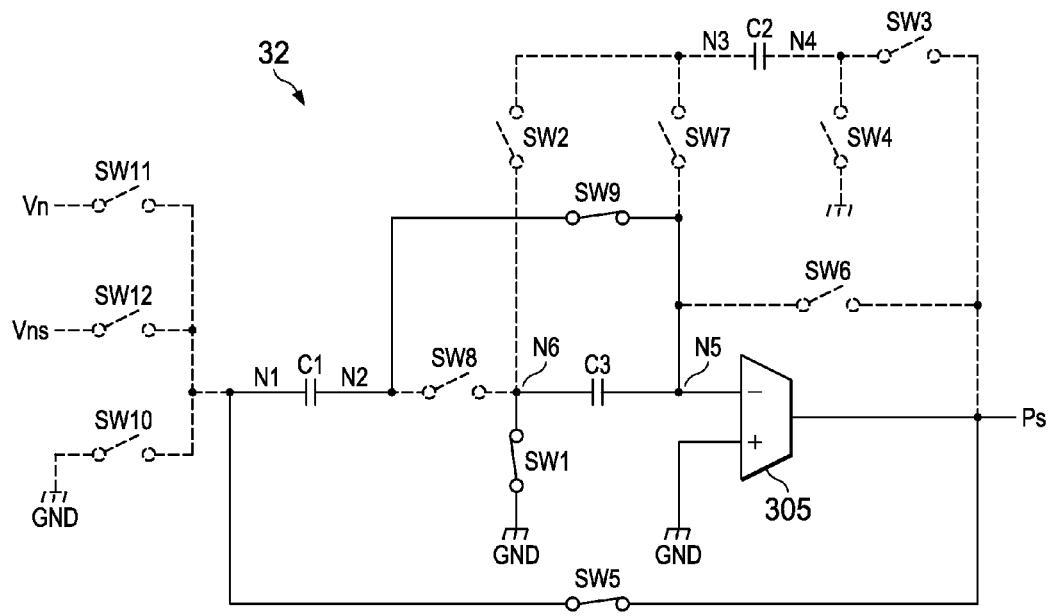
FIG. 12 shows an example of the read circuit of FIG. 5 connected in the correction phase.

FIG. 12 shows an example of read circuit 32 connected in the correction phase.

The ON or OFF state of each switch in the correction phase is as follows.

ON: SW1, SW5, SW9

OFF: SW2, SW3, SW4, SW6, SW7, SW8, SW10, SW11, SW12

In the correction phase, the output terminal Ps of operational amplifier 305 is connected to node N5 through capacitor C1, and node N5 is connected to reference voltage GND through capacitor C3.

In this case, the voltage held at capacitor C3 and offset voltage Vofs produced at node N5 are approximately equal, so the amount of charge in capacitor C3 does not change from the value in the immediately preceding charge transfer phase. Therefore, the amount of charge in capacitor C1, which is connected in series with capacitor C3, is kept approximately the same.

On the other hand, the voltage at node N2 is approximately equal to reference voltage GND in the charge transfer phase, but shifts by the amount of offset voltage Vofs from reference potential GND in the correction phase. That is, while the amount of charge in capacitor C1 is held, the voltage at node N2 shifts by the amount of offset voltage Vofs. For this reason, the output voltage (voltage at node N1) of operational amplifier 305 shifts by the amount of offset voltage Vofs, compared to the charge transfer phase.

This voltage shift cancels the error component produced by offset voltage Vofs applied to capacitor C2 in the initial phase. That is, the error component produced by offset voltage Vofs remaining in voltage Vo1 of capacitor C1 is corrected in the correction phase.

Pixel signals Ps amplified as described above are output at one time from read circuits 32-1 to 32-j. Pixel signals Ps output from read circuits 32-1 to 32-j are held in capacitors CM1 to CMj of the respective serial conversion circuit 33 (FIG. 6). Pixel signals Ps held in capacitors CM1 to CMj are serially output in succession through operational amplifier 306. The pixel signals that are output serially from serial conversion circuit 33 are converted to digital pixel data Pdat in analog-digital conversion circuit 34.

As explained above, with this embodiment, after the charge in capacitor C2 is discharged in the initial phase (FIG. 7), a signal charge corresponding to the difference between pixel signals (N−NS) is repeatedly transferred to capacitor C2 in the integration phase. That is, in the integration phase, in the first signal accumulation operation (FIG. 7, FIG. 9), a charge corresponding to reset signal N is accumulated in capacitor C1, and in the second signal accumulation operation following the first signal accumulation operation (FIG. 8), a charge corresponding to pixel signal NS is accumulated in capacitor C1, and a signal charge corresponding to the difference (N−NS) is also transferred from capacitor C1 to capacitor C2. The first signal accumulation operation and the second signal accumulation operation are repeated a number of times corresponding to the gain setting value.

In this way, with this embodiment, a signal charge proportional to the number of repetitions (K) of the signal accumulation operations is accumulated in capacitor C2, and an amplification effect based on the signal charge is obtained, so gain can be set independent of the capacitor capacitance ratio. Thus, it is not necessary to provide a large-capacitance capacitor with high gain, as in the amplifying circuit shown in FIG. 26, for example, so the circuit surface area can be limited.

Figure 26:
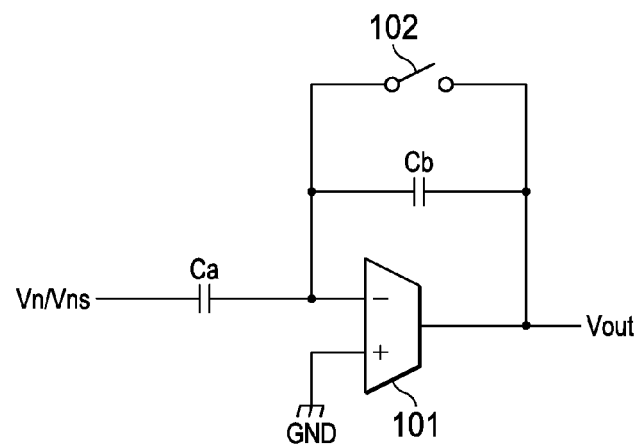
FIG. 26 shows an example of an ordinary switched capacitor amplifier that performs amplification and CDS of pixel signals in an image sensor of the prior art.

In addition, because it is not necessary to provide a large-capacitance capacitor to obtain the desired gain, a reduction in the amount of feedback produced by driving a large-capacitance capacitor is augmented, as in the amplifying circuit shown in FIG. 26, for example, so it is not necessary to widen the gain bandwidth of the operational amplifier or increase the direct current gain. Therefore, increased power consumption and circuit surface area in the operational amplifier can be limited.

In addition, with this embodiment, because gain can be changed without switching of the capacitors, increased circuit surface area produced by providing circuitry for switching can be avoided.

In addition, with this embodiment, the amplification effect is obtained by integrating signal charges in capacitor C2, so the integration works as a low-pass filter, and the effects of high-frequency noise can be significantly reduced. Low-frequency noise can be reduced by CDS processing by taking the difference of two input signals.

In addition, with this embodiment, gain magnitude is set by transferring a repeated signal charge from capacitor C1 to capacitor C2, so gain monotonicity can be assured structurally.

With the amplifying circuit shown in FIG. 26, the ideal gain that is proportional to the capacitance ratio as shown in formula (1) is obtained by the effect of change in the amount of feedback to operational amplifier 101, etc. Even when electrostatic capacitance value is programmable with a method of switching between multiple capacitors that have binary weighting, the gain magnitude cannot be changed monotonically relative to the value of the digital signal. On the other hand, with this embodiment, gain changes monotonically relative to the number of repetitions K of the signal accumulation operations in the integration phase, and monotonicity is not subject to effects such as the characteristics of operational amplifier 305. For this reason, gain can be set more accurately than with the amplifying circuit shown in FIG. 26.

In addition, with this embodiment, power consumption and circuit surface area of read circuit 32 can be limited, so overall power consumption can be kept lower while using a system with high parallelism where a read circuit 32 is provided for each column of pixel array 1. Furthermore, because the integration phase time for each read circuit 32 can be sufficiently assured in the scan period for one line, even when amplification processing time becomes somewhat longer, overall processing speed can be maintained.

In addition, with this embodiment, after the repeated signal charge is transferred from capacitor C1 to capacitor C2 in the integration phase, the charge in capacitor C1 is eliminated in the discharge phase (FIG. 10), and the signal charge is transferred from capacitor C2 to capacitor C1 in the charge transfer phase (FIG. 11).

In this way, with this embodiment, an amplification effect that is not dependent on the electrostatic capacitances of capacitors C1 and C2, as shown in formula (3), can be obtained by returning the signal charge integrated in capacitor C2 to capacitor C1. Therefore, gain can be set accurately unaffected by variation in capacitor capacitance.

In addition, with this embodiment, offset voltage Vofs of operational amplifier 305 is held in capacitor C3 by a feedback path being formed from the output of operational amplifier 305 to node N5 (negative input terminal) and by node N5 being connected to reference voltage GND through capacitor C3 in the initial phase (FIG. 7). Offset voltage Vofs of operational amplifier 305 occurring at node N5 is canceled by the voltage in capacitor C3 by the output terminal of operational amplifier 305 being connected to node N2 through capacitor C1 and by node N5 being connected to node N2 through capacitor C3 in the second signal accumulation operation (FIG. 8). That is, the voltage at node N2 will be approximately equal to reference voltage GND. Because pixel signal NS is input to capacitor C1 from node N1 in this state, an accurate pixel signal NS is input to capacitor C1, and an accurate signal charge for the difference (N−NS) is transferred from capacitor C1 to capacitor C2.

Therefore, with this embodiment, the integration error produced by offset voltage Vofs of operational amplifier 305 will be very small, and the error that is integrated is small, even when the signal accumulation operation is repeated many times, so high gain can be accurately set.

In addition, with this embodiment, offset voltage Vofs of node N5 is canceled by the voltage in capacitor C3 the same way as described above in the charge transfer operation (FIG. 11), as well, and the voltage at node N2 will be approximately equal to reference voltage GND. Because signal charge is accurately transferred from capacitor C2 to capacitor C1, error in offset voltage Vofs in the output signal can be reduced.

In addition, with this embodiment, the output terminal Ps of operational amplifier 305 is connected to node N5 through capacitor C1, and node N5 is connected to reference voltage GND through capacitor C3 in the correction phase (FIG. 12). Because of this, the component caused by offset voltage Vofs, which is applied to capacitor C2 in the initial phase (FIG. 7), is corrected using offset voltage Vofs held in capacitor C3, so error in offset voltage Vofs in the output signal can be reduced.

Next, a second embodiment of the present invention will be explained.

Figure 13:
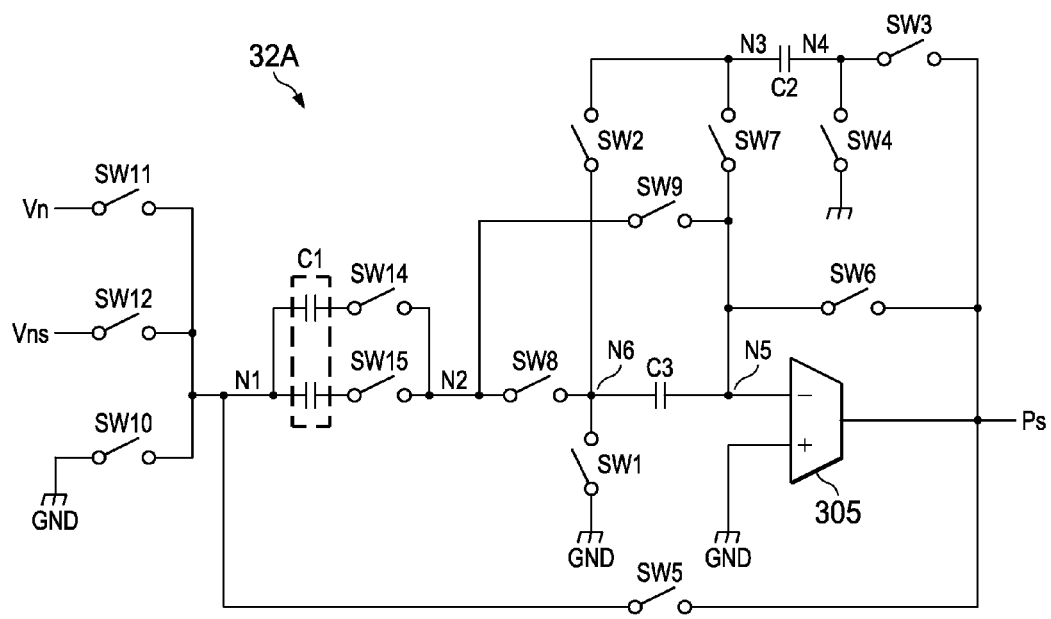
FIG. 13 shows an example of the configuration of a read circuit in a second embodiment.

With the imaging device pertaining to the second embodiment, read circuit 32 in the imaging device pertaining to the first embodiment (FIG. 5) is replaced with a read circuit 32A in which the capacitance of capacitor C1 is variable (FIG. 13).

With read circuit 32 shown in FIG. 5, gain is set according to the number of repetitions of the signal accumulation operations in the integration phase, but with read circuit 32A in this embodiment, gain can additionally be adjusted according to the capacitance ratio of capacitors C1 and C2.

FIG. 13 shows an example of the configuration of read circuit 32A.

Read circuit 32A shown in FIG. 13 has capacitor C1, which includes two unit capacitors connected in parallel between nodes N1 and N2, and switch circuits SW14 and SW15 provided in the conduction path between the unit capacitors and node N2. The other components in read circuit 32A are the same as read circuit 32 shown in FIG. 5. Switch circuits SW14 and SW15 are an embodiment of the selection circuit in the present information.

With read circuit 32A shown in FIG. 13, the capacitance of capacitor C1 is changed by switch circuits SW14 and SW15. For example, assuming that the two unit capacitors have approximately the same electrostatic capacitance 'Ct,' the electrostatic capacitance of capacitor C1 will be 'Ct' when only one switch circuit SW14 or SW15 is ON, and will be '2 Ct' when both switch circuits SW14 and SW15 are ON.

Figure 14:
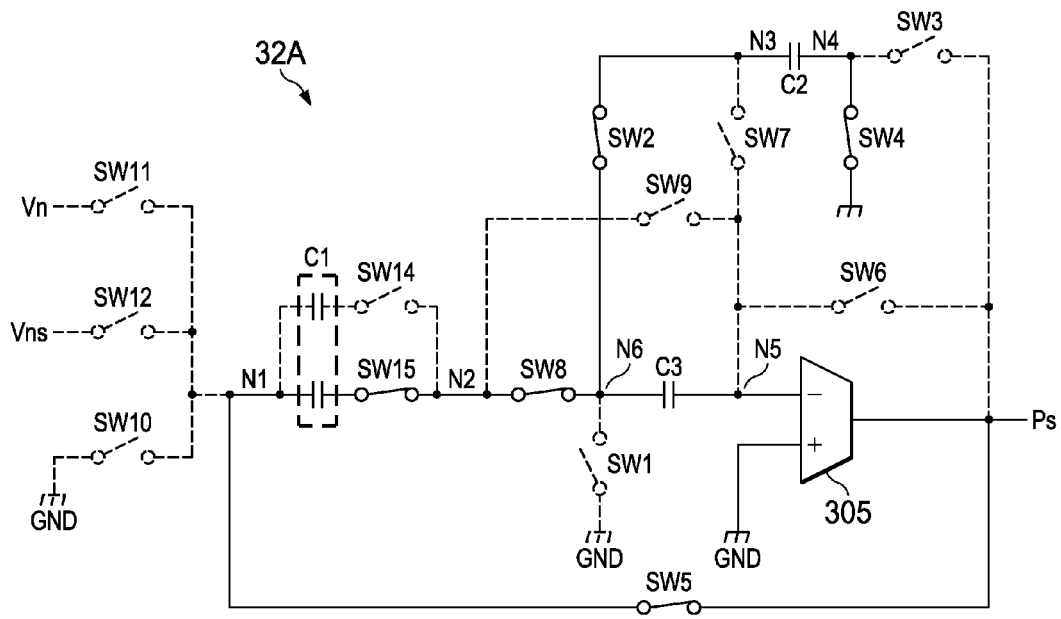
FIG. 14 shows an example of the read circuit of FIG. 13 connected in the charge transfer phase.

Switch circuits SW14 and SW15 are both ON in the initial phase, the integration phase and the discharge phase, and only one is ON in the charge transfer phase and the correction phase. FIG. 14 shows read circuit 32A connected in the charge transfer phase.

The electrostatic capacitance of capacitor C1 will be one half when shifting from the integration phase to the charge transfer phase according to the operation of switch circuits SW14 and SW15. When the electrostatic capacitance of capacitor C1 changes to one half, the voltage at capacitor C1 doubles. Thus when electrostatic capacitance does not change, the gain will double.

With the example in FIG. 13, capacitor C1 is configured with two unit capacitors, and the capacitance ratio of capacitors C1 and C2 can be changed in the desired range by appropriately setting the number of unit capacitors and the electrostatic capacitance value of each unit capacitor.

In this way, with this embodiment, gain can be adjusted by changing the electrostatic capacitance ratio of capacitors C1 and C2 when shifting from the integration phase to the charge transfer phase. For example, gain can be X times by changing the capacitance of capacitor C1 to 1/X when shifting from the integration phase to the charge transfer phase. The number of repetitions of the signal accumulation operations required to obtain the same gain can be reduced by achieving gain according to the change in electrostatic capacitance of capacitors C1 and C2, so the time required for amplification processing can be shortened.

Next, a third embodiment of the present invention will be explained.

Figure 15:
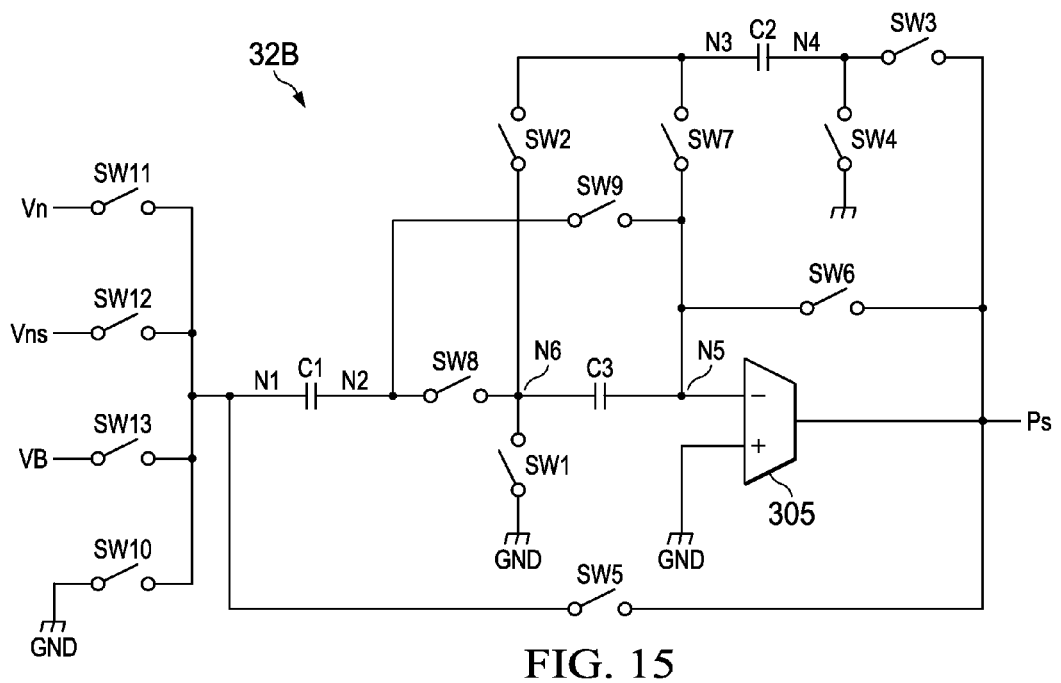
FIG. 15 shows an example of the configuration of a read circuit in a third embodiment.

With the imaging device pertaining to the third embodiment, read circuit 32 in the imaging device pertaining to the first embodiment (FIG. 5) is replaced with read circuit 32B to which a dark level voltage VB can be input (FIG. 15).

With read circuit 32 shown in FIG. 5, the signal charge is integrated in the integration phase, but with read circuit 32B in this embodiment, a reference charge for setting the desired dark level is integrated, in addition to the signal charge.

FIG. 15 shows an example of read circuit 32B.

Read circuit 32B shown in FIG. 15 has a switch circuit SW13 to input dark level voltage VB to node N1. The other components of read circuit 32B are the same as read circuit 32 shown in FIG. 5.

With read circuit 32B shown in FIG. 15, in the integration phase, the signal charge is accumulated by repeating the first signal accumulation operation (FIG. 7, FIG. 9) and the second signal accumulation operation (FIG. 8) already explained, while in addition to this, a reference charge is also integrated by repeating a first reference signal accumulation operation (FIG. 16) and a second reference signal accumulation operation (FIG. 17) described next.

Figure 16:
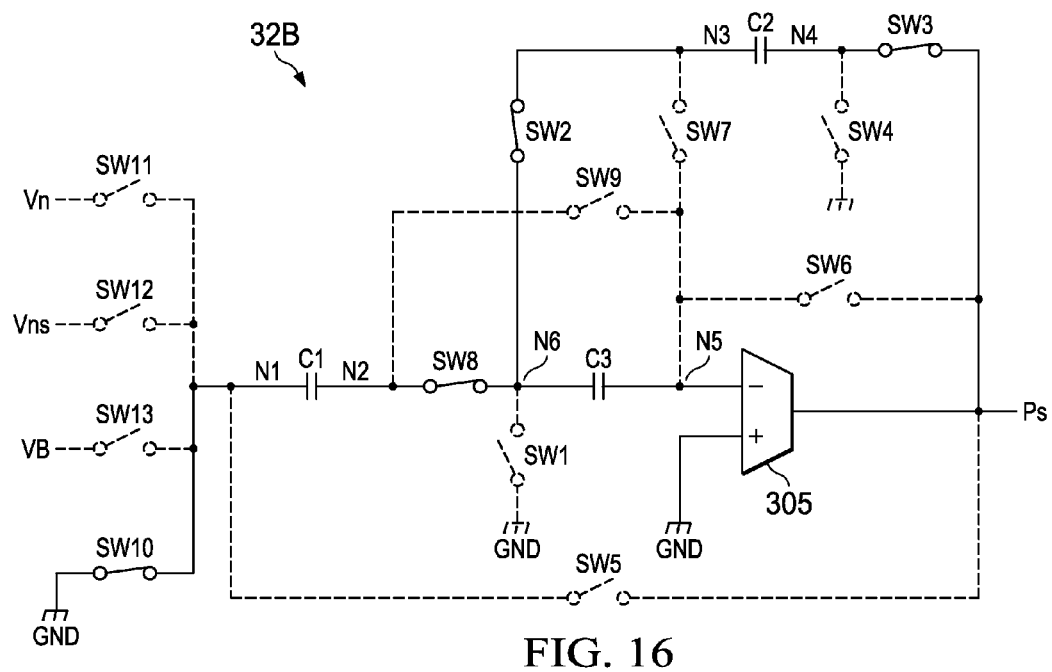
FIG. 16 shows an example of the read circuit of FIG. 15 connected in the first reference signal accumulation operation.

FIG. 16 shows an example of read circuit 32B connected in the first reference signal accumulation operation.

The first reference signal accumulation operation shown in FIG. 16 is basically the same as the first signal accumulation operation shown in FIG. 9, and the difference is that reference voltage GND is input to node N1. That is, with the first reference signal accumulation operation shown in FIG. 16, switch circuits SW11, SW12 and SW13 are OFF, and switch circuit SW10 is ON.

The voltage in capacitor C1 will be zero due to the first reference signal accumulation operation.

Figure 17:
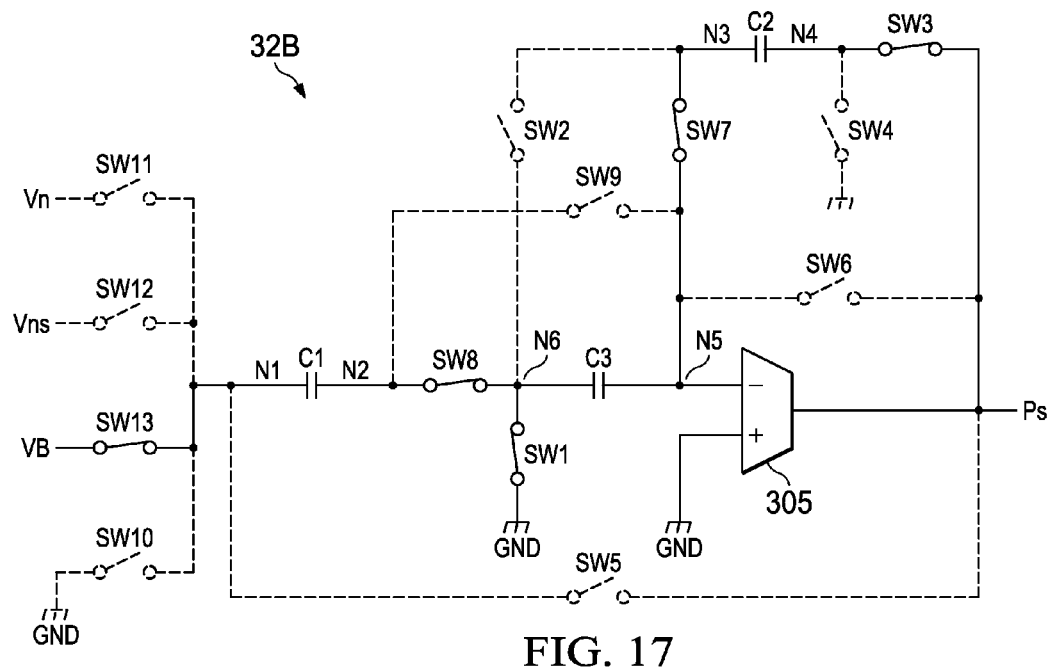
FIG. 17 shows an example of the read circuit of FIG. 15 connected in the second reference signal accumulation operation.

FIG. 17 shows an example of read circuit 32B connected in the second reference signal accumulation operation.

The second reference signal accumulation operation shown in FIG. 17 is basically the same as the second signal accumulation operation shown in FIG. 8, and the difference is that dark level voltage VB is input to node N1. That is, with the second reference signal accumulation operation shown in FIG. 17, switch circuits SW10, SW11 and SW12 are OFF, and switch circuit SW13 is ON.

With the second reference signal accumulation operation, the voltage at node N2 is approximately equal to reference voltage GND, so a charge 'C1×VB' is accumulated in capacitor C1. Because the charge in capacitor C1 in the first reference signal accumulation operation immediately preceding is zero, a reference voltage of 'C1×(−VB)' for the difference is transferred from capacitor C1 to capacitor C2.

With read circuit 32B, first, a signal charge is accumulated in capacitor C2 with the initial phase (FIG. 7) and the second signal accumulation operation (FIG. 8), and then a reference charge is accumulated in capacitor C2 by the first reference signal accumulation operation (FIG. 16) and the second reference signal accumulation operation (FIG. 17). Thereafter, read circuit 32B repeats signal charge accumulation (FIG. 9, FIG. 8) and reference charge accumulation (FIG. 16, FIG. 17) a number of times corresponding to the gain setting value. The charge accumulation sequence is arbitrary, and for example, signal charge accumulation (FIG. 9, FIG. 8) and reference charge accumulation (FIG. 16, FIG. 17) could be performed alternately, or one charge accumulation could be performed continuously, and then the other charge accumulation could be performed continuously.

After a signal charge and a reference charge are accumulated in capacitor C2 in the integration phase, read circuit 32B transfers the charge in capacitor C2 to capacitor C1 with the discharge phase (FIG. 10) and the charge transfer phase (FIG. 11), and error in offset voltage Vofs is corrected by the correction phase (FIG. 12).

Signal Ps output from read circuit 32B in this way is the equivalent of amplifying the result (Vns−Vn+VB) of dark level voltage VB added to the voltage difference between pixel signals (Vns−Vn). Therefore, with this embodiment, the dark level of pixel signals can be adjusted freely by adjusting dark level voltage VB.

Note that with the example described above, dark level voltage VB is added to differential voltage (Vns−Vn), but dark level voltage VB can also be subtracted from differential voltage (Vns−Vn) by reversing the operation of switch circuits SW10 and SW13. In concrete terms, dark level voltage VB could be input to node N1 in the first reference signal accumulation operation (FIG. 16) (switch circuit SW13 is ON, switch circuit SW10 is OFF), and reference voltage GND may be input to node N1 in the second reference signal accumulation operation (FIG. 17) (switch circuit SW13 is OFF, switch circuit SW10 is ON). Therefore, with this embodiment, positive or negative adjustment of the dark level can easily be accomplished.

Next, a fourth embodiment of the present invention will be explained.

Figure 18:
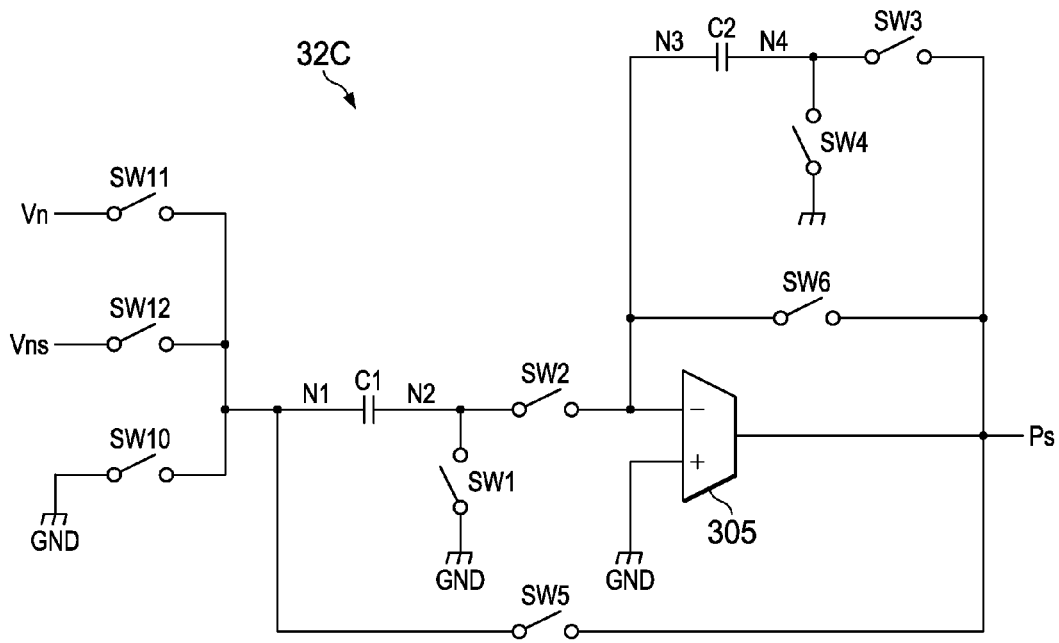
FIG. 18 shows an example of the configuration of a read circuit in a fourth embodiment.

With the imaging device pertaining to the fourth embodiment, read circuit 32 in the imaging device pertaining to the first embodiment (FIG. 5) is replaced with read circuit 32C with a simpler configuration (FIG. 18).

FIG. 18 shows an example of the configuration of read circuit 32C.

With read circuit 32C shown in FIG. 18, switch circuits SW7, SW8 and SW9 and capacitor C3 in read circuit 32 shown in FIG. 5 are omitted. The locations of switch circuits SW7 and SW8 are shorted, and the locations of switch circuit SW9 and capacitor C3 are open. Otherwise the configuration of read circuit 32C is the same as read circuit 32.

Read circuit 32C shown in FIG. 18 performs amplification processing in the order initial phase, integration phase, discharge phase, and charge transfer phase, and no correction phase is performed. The state of the switch circuits in each phase in read circuit 32C is roughly the same as read circuit 32.

1. Initial Phase (FIG. 19)

Figure 19:
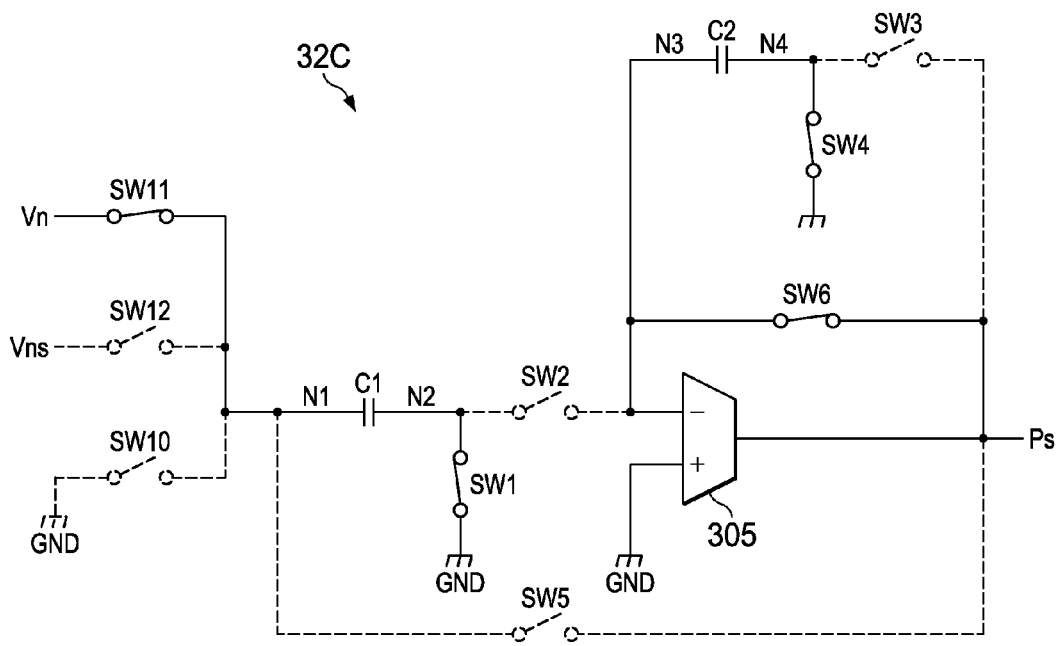
FIG. 19 shows an example of the read circuit of FIG. 18 in the initial phase.

FIG. 19 shows read circuit 32C connected in the initial phase.

The ON or OFF state of each switch circuit in the initial phase is as follows.

ON: SW1, SW4, SW6, SW11
OFF: SW2, SW3, SW5, SW10, SW12

In the initial phase, the output terminal Ps of operational amplifier 305 is connected to the negative input terminal, and capacitor C2 is connected between the negative input terminal and the positive imputer terminal. Very small offset voltage Vofs from operational amplifier 305 is applied to capacitor C2 because of this.

In the meantime, reset level signal N (voltage Vn) is input to node N1, and node N2 is connected to reference voltage GND. Therefore, reset level signal N (voltage Vn) is held in capacitor C1.

2. Integration Phase (FIG. 19, FIG. 20, FIG. 21)

In the integration phase, the first signal accumulation operator to accumulate a charge corresponding to voltage Vn in capacitor C1, and a second signal accumulation operation to transfer a signal charge corresponding to difference (Vn−Vns) from capacitor C1 to capacitor C2 are repeated, and a signal charge is accumulated in capacitor C2.

The first iteration of the first signal accumulation operation is performed simultaneously with the initial phase in the connection state shown in FIG. 19, the same as read circuit 32 shown in FIG. 5. After the initial phase, the second signal accumulation operation shown in FIG. 20 is performed. Thereafter, the first signal accumulation operation shown in FIG. 21 and the second signal accumulation operation shown in FIG. 20 are repeated a number of times corresponding to the gain setting value.

Figure 20:
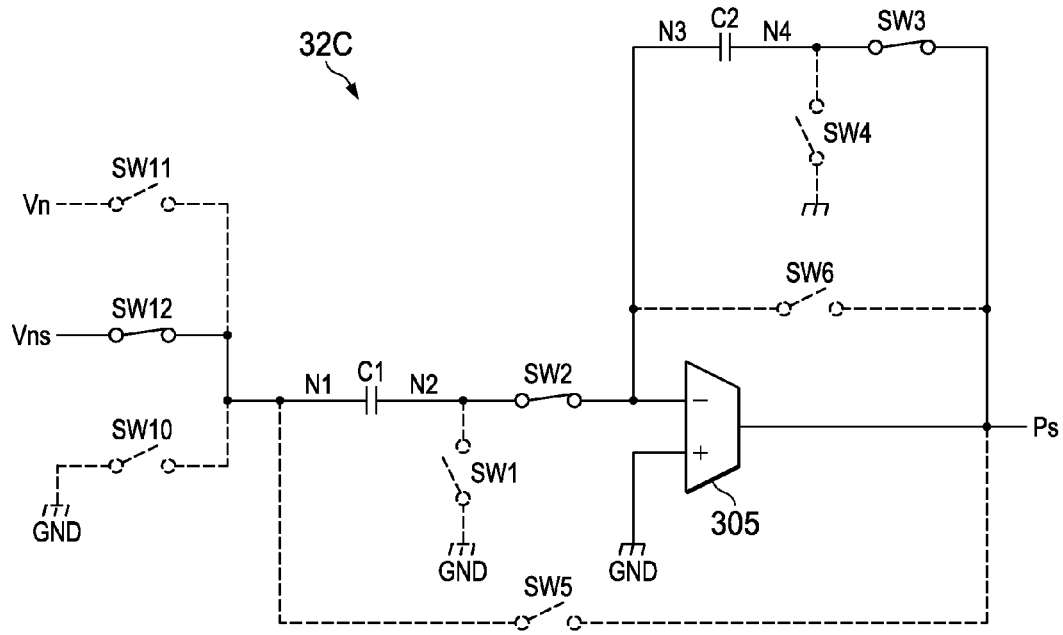
FIG. 20 shows an example of the read circuit of FIG. 18 connected in the second signal accumulation operation.
Figure 21:
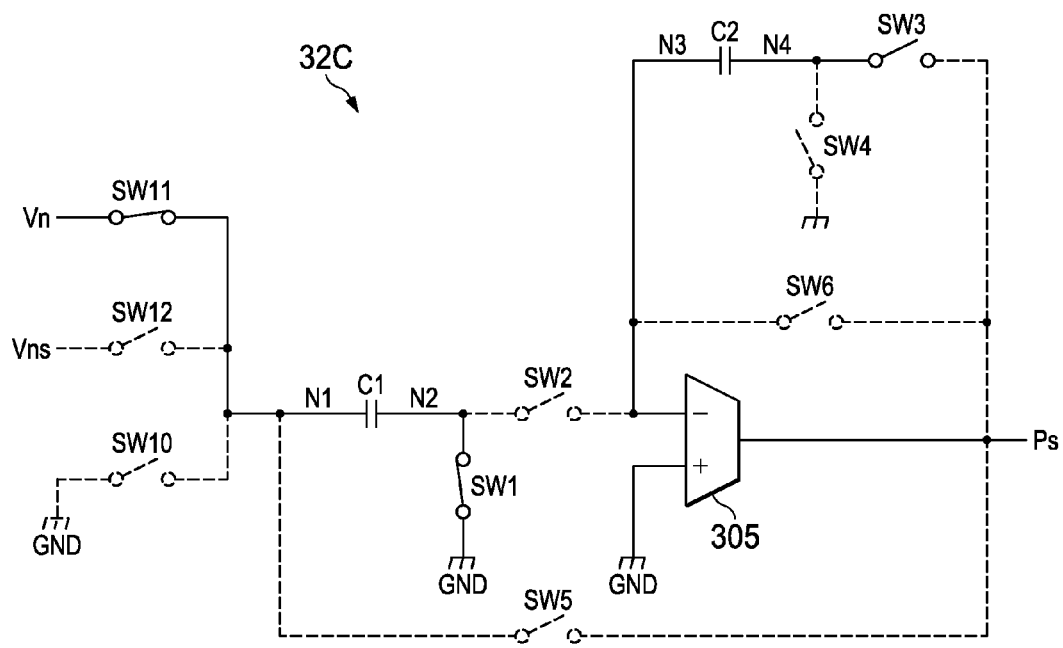
FIG. 21 shows an example of the read circuit of FIG. 18 connected in the first signal accumulation operation.

FIG. 20 shows read circuit 32C connected in the second signal accumulation operation.

The ON or OFF state of each switch circuit in the second signal accumulation operation is as follows.

ON: SW2, SW3, SW12
OFF: SW1, SW4, SW5, SW6, SW10, SW11

With the second signal accumulation operation, voltage Vns is input to node N1, and the output terminal of operational amplifier 305 is connected to node N2 through capacitor C2.

In this instance, the negative feedback works so that the voltage at node N2 is approximately equal to reference voltage GND, so charge 'C1×Vns' is accumulated in capacitor C1, and a signal charge 'C1×(Vn−Vns)' for the difference is transferred from capacitor C1 to C2.

FIG. 21 shows an example of read circuit 32C connected in the first signal accumulation operation from the second iteration on.

The ON or OFF state of each switch circuit in the first signal accumulation operation from the second iteration on is as follows.

ON: SW1, SW11
OFF: SW2, SW3, SW4, SW5, SW6, SW10, SW12

In the signal accumulation operation shown in FIG. 21, voltage Vn is input to node N1, and node N2 is connected to reference voltage GND, so voltage Vn is held at capacitor C1.

In this instance, switch circuit SW3 is OFF, so the charge accumulated in capacitor C2 is kept constant.

3. Discharge Phase (FIG. 22)

In the discharge phase, the charge accumulated in capacitor C1 in the last second signal accumulation operation in the integration phase is discharged.

Figure 22:
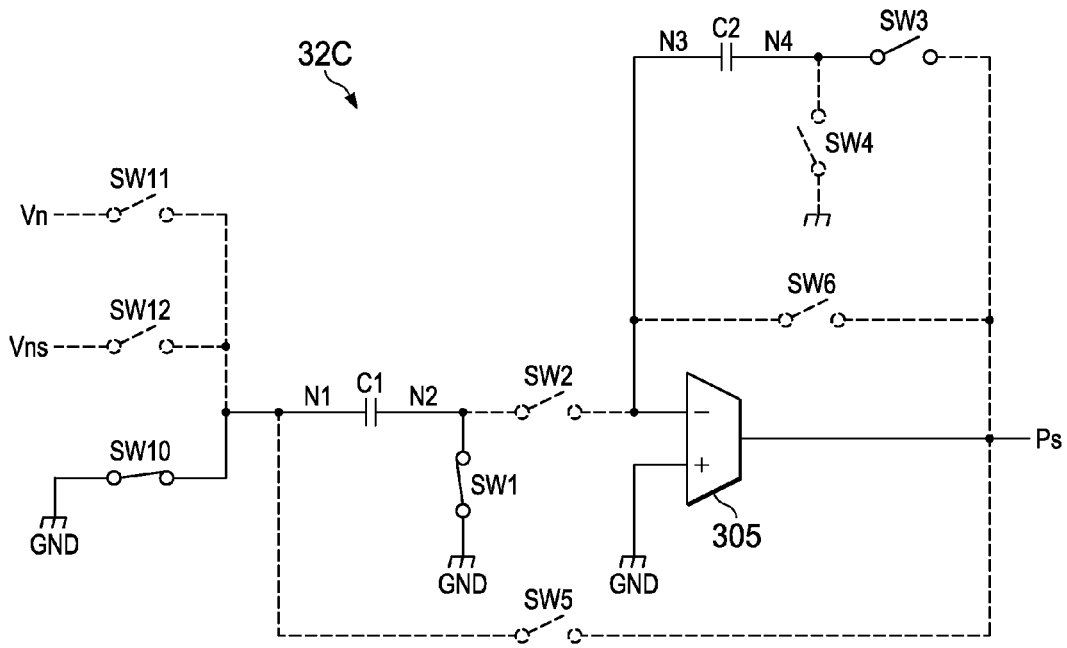
FIG. 22 shows an example of the read circuit of FIG. 18 connected in the discharge phase.

FIG. 22 shows an example of read circuit 32C connected in the discharge phase.

The ON or OFF state of each switch circuit in the discharge phase is as follows.

ON: SW1, SW10
OFF: SW2, SW3, SW4, SW5, SW6, SW11, SW12

In the discharge phase, node N1 and node N2 are connected to reference voltage GND, so the charge accumulated in capacitor C1 in the integration phase is discharged. In addition, in this instance, because switch circuit SW3 is OFF, the charge accumulated in capacitor C2 is kept constant.

4. Charge Transfer Phase (FIG. 23)

Figure 23:
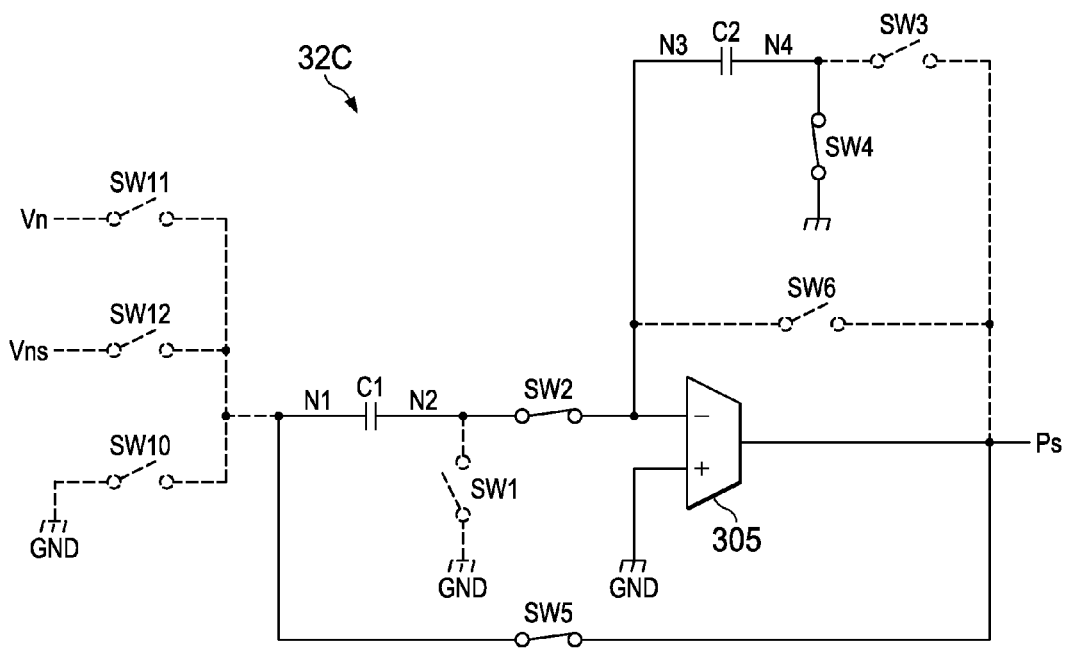
FIG. 23 shows an example of the read circuit of FIG. 18 connected in the charge transfer phase.

FIG. 23 shows an example of read circuit 32C connected in the charge transfer phase.

The ON or OFF state of each switch in the charge transfer phase is as follows.

ON: SW2, SW4, SW5
OFF: SW1, SW3, SW6, SW10, SW11, SW12

In the charge transfer phase, the output terminal of operational amplifier 305 is connected to node N2 through capacitor C1, and node N2 is connected to reference voltage GND through capacitor C2. In this case, negative feedback works so that the voltage at node N2 will be approximately equal to reference voltage GND, so the voltage at capacitor C2 will be approximately zero, and all the charge accumulated in capacitor C2 is transferred to capacitor C1.

In this embodiment, too, the same as the embodiments already explained, a charge signal that is proportional to the number of repetitions of the signal accumulation operations is integrated in capacitor C2, and amplified results are obtained based on the signal charge, so the same effects as with the embodiments already described, such as being able to limit an increase in power consumption and circuit surface area, can be accomplished.

In addition, by returning the signal charge accumulated in capacitor C2 to capacitor C1, amplification effects that are not dependent on the electrostatic capacitance of capacitors C1 and C2 can be obtained, so gain setting precision can be improved the same way as in the embodiments described above.

Next, a fifth embodiment of the present invention will be explained.

Figure 24:
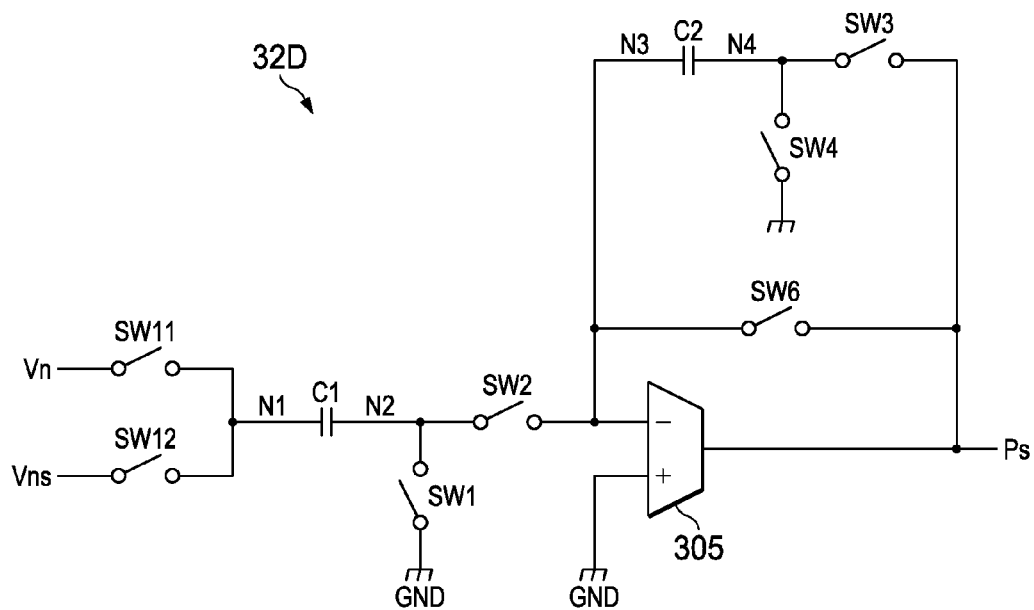
FIG. 24 shows an example of the configuration of a read circuit in a fifth embodiment.

With the imaging device pertaining to the fifth embodiment, read circuit 32C in the imaging device pertaining to the fourth embodiment (FIG. 18) is replaced with read circuit 32D with an even simpler configuration (FIG. 24).

With read circuit 32D shown in FIG. 24, switch circuits SW5 and SW10 in read circuit 32C shown in FIG. 18 are omitted. The locations of switch circuits SW5 and SW10 are open. Otherwise, the configuration of read circuit 32D is the same as read circuit 32C.

With read circuit 32C shown in FIG. 24, amplification processing is performed in the order initial phase and integration phase. The discharge phase and the charge transfer phase are omitted. Switch circuit state in each phase in read circuit 32D is the same as read circuit 32C shown in FIG. 18.

In this embodiment, too, the same as in the embodiments already explained, a signal charge that is proportional to the number of repetitions of the signal accumulation operations is integrated in capacitor C2, and amplification results are obtained based on the signal charge, so the same effects as the embodiments already described, such as being able to limit an increase in power consumption and circuit surface area, can be accomplished.

Next, a sixth embodiment will be explained.

Figure 25:
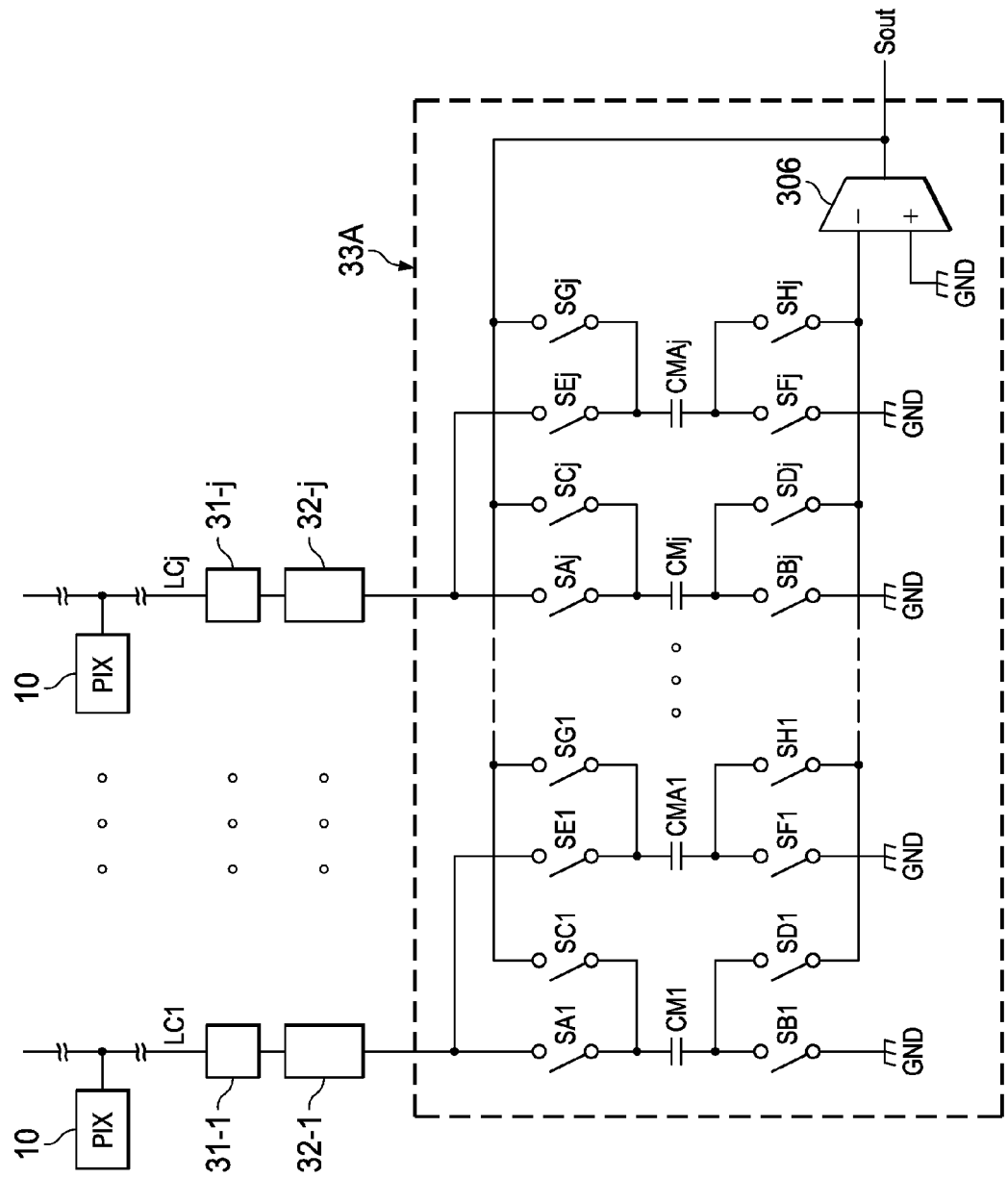
FIG. 25 shows an example of the configuration of a serial conversion circuit in a sixth embodiment.

With the imaging device pertaining to the sixth embodiment, serial conversion circuit 33 in the imaging device pertaining to the first embodiment (FIG. 6) is replaced with a serial conversion circuit 33A provided with two lines worth of memory (FIG. 25).

Serial conversion circuit 33A shown in FIG. 25, in addition to the same configuration as serial conversion circuit 33 shown in FIG. 6, additionally has capacitors CMA1 to CMAj, and switch circuits SE1 to SEj, SF1 to SFj, SG1 to SGj and SH1 to SHj.

Capacitor CMAk (k=1-j) holds pixel signal Ps output from read circuit 32-k. One terminal of capacitor CMAk is connected to the output of read circuit 32-k through switch circuit SEk, and is also connected to the output Sout of operational amplifier 306 through switch circuit SGk. The other terminal of capacitor CMAk is connected to reference voltage GND through switch circuit SFk, and is also connected to the negative input terminal of operational amplifier 306 through switch circuit SHk.

Capacitors CM1 to CMj and capacitors CMA1 to CMAj each constitute a memory that holds one line worth of pixel signals Ps. When pixel signals Ps for on line are input in parallel to one memory, pixel signals for the perceiving line are output serially from the other memory.

For example, in the period in which pixel signals Ps for a certain line are output from read circuits 32-1 to 32-j, switch circuits SA1 to SAj and SB1 to SBj are all ON, and switch circuits SC1 to SCj and SD1 to SDj are all OFF, so that pixel signals Ps are input from read circuits 32-1 to 32-j to capacitors CM1 to CMj. On the other hand, in this period, switch circuits SE1 to SEj and SF1 to SFj are all OFF, and switch circuits SG1 to SGj and SH1 to SHj come ON successively, so that pixel signals Ps for the previous line held in capacitors CMA1 to CMAj are output serially from operational amplifier 306.

The period for the one line ends, and in the period in which the next line of pixel signals Ps is output from read circuits 32-1 to 32-j, by switch circuits SE1 to SEj and SF1 to SFj all being ON, and switch circuits SG1 to SGj and SH1 to SHj all being OFF, the opposite of the, pixel signals Ps are input to capacitors CMA1 to CMAj from read circuits 32-1 to 32-j. In this period, by switch circuits SA1 to SAj and SB1 to SBj all being OFF, and by switch circuits SC1 to SCj and SD1 to SDj successively coming ON, the previous line of pixel signals Ps held in capacitors CM1 to CMj are output serially from operational amplifier 306.

With this embodiment, while one line of pixel signals Ps in read circuits 32-1 to 32-j is being input to one memory, the pixel signals Ps can be output serially from the other memory. An entire one line period can be assigned to amplification processing by read circuits 32-1 to 32-j by this, so amplification processing can be accomplished with a margin, even when the number of repetitions in the integration phase becomes large, and high gain can be achieved.

In addition, because margin occurs in the amplification processing period, it is possible to make the electrostatic capacitance of capacitors C1 and C2 relatively large. By so doing, even when capacitor charge changes due to phenomena such as clock feed-through accompanying individual switch circuits being turned ON and OFF, voltage error produced by the change will be relatively small, so pixel signals can be amplified more precisely.

Several embodiments of the present invention were explained above, but the present invention is not limited to only the abovementioned embodiments and includes many variations.

With the abovementioned embodiments, the first signal accumulation operation is performed simultaneously in the initial phase (FIG. 7), but the first signal accumulation operation could also be performed following the initial phase.

With the abovementioned second embodiment, the capacitance of capacitor C1 is variable, and capacitor C2 is fixed (FIG. 13), but the present invention is not limited to this. For example, the capacitance of capacitor C2 could be variable, and the capacitance of capacitor C1 could be fixed. Alternatively, the capacitance of both capacitors could also be variable.

With the abovementioned embodiments, discharge by capacitor C2 in the initial phase (FIG. 7) and discharge by capacitor C1 in the discharge phase (FIG. 10) are performed with switch circuits used in separate phases, but the present invention is not limited to this. For example, discharge could also be performed with specialized switch circuits connected in parallel with the capacitors. It is also not necessary to bring the charge to zero with the discharge, and the capacitors could be discharged to a fixed charge that is not zero.

In the first charge accumulation operation (FIG. 9) and the discharge phase (FIG. 10), the charge of capacitor C2 is held in a feedback loop, but the present invention is not limited to this. For example, the charge could also be held with at least one terminal of capacitor C2 opened.

In the abovementioned embodiments, analog-digital conversion is performed in a stage after serial conversion circuit 33, but the present invention is not limited to this. For example, an analog-digital conversion circuit could also be provided in a stage after each read circuit.

The imaging device of the present invention could also be configured with one semiconductor chip, or it could be configured with multiple semiconductor chips.

With the abovementioned embodiments, examples in which the amplifying circuit of the present invention is applied to an imaging device were shown, but the amplifying circuit of the present invention is not limited to this. That is, the amplifying circuit of the present invention can be applied broadly to any device that amplifies the difference between two signals.

What is claimed is:

1. An amplification circuit that amplifies the difference between a first signal and a second signal, comprising:
a first capacitor connected between a first node and a second node;
a second capacitor connected between a third node and a fourth node;
an input circuit receiving said first signal and said second signal and connecting a selected one of said first signal or said second signal to said first node;
a first switch circuit having an ON state connecting said second node to a reference voltage and an OFF state isolating said second node from the reference voltage;
a second switch circuit having an ON state connecting said second node to said third node and an OFF state isolating said second node from said third node;
a current supply circuit supplying current to said fourth node whereby a voltage at said third node will approach said reference voltage;
a second capacitor discharge circuit selectively discharging said second capacitor; and
wherein said amplification circuit operates in
an initial phase wherein said second capacitor discharge circuit discharges the charge in said second capacitor,
an integration phase including
a first signal accumulation operation wherein said first switch circuit is in said ON state, said second switch circuit is in said OFF state and said input circuit inputs said first signal to said first node, and
a second signal accumulation operation wherein said first switch circuit is in said OFF state, said second switch circuit is in said ON state and said input circuit inputs said second signal to said first node, following said first signal accumulation operation, repeated a number of times corresponding to an amplification factor.

2. The amplification circuit of claim 1, further comprising:
a third switch circuit having an ON state connecting said fourth node to a current output terminal of said current supply circuit and an OFF state isolating said fourth node from current output terminal of said current supply circuit;
a fourth switch circuit having an ON state connecting said fourth node to said reference voltage and an OFF state isolating said fourth node from said reference voltage;
a fifth switch circuit having an ON state connecting said first node to the current output terminal of said current supply circuit and an OFF state isolating said first node from the current output terminal of said current supply circuit;
a first capacitor discharge circuit selectively discharging said first capacitor;
wherein said amplification circuit further operates in
said integration phase wherein said fourth switch circuit and said fifth switch circuit are in said OFF state,
at least said second signal accumulation operation of said integration phase wherein said third switch circuit is in said ON state,
a discharge phase after said integration phase wherein said first capacitor discharge circuit discharges said first capacitor, and
a charge transfer phase after said discharge phase, said first switch circuit and said third switch circuit are in said OFF state, said second switch circuit, said fourth switch circuit and said fifth switch circuit are in said ON and said current supply circuit supplies current to said first node so that the voltage at said third node approaches said reference voltage.

3. The amplification circuit of claim 2, further comprising:
a third capacitor connected between a fifth node and said second node;
a sixth switch circuit having an ON state connecting said fifth node to said current output terminal of said current supply circuit and an OFF state isolating said fifth node from said current output terminal of said current supply circuit;
wherein said current supply circuit outputs a current corresponding to a voltage difference between a voltage at said fifth node and said reference voltage; and
wherein said amplification circuit further operates in
said initial phase wherein said second switch circuit and said fifth switch circuit are in said OFF state, and said first switch circuit and said sixth switch circuit are in said ON state,
said second signal accumulation operation of said integration phase and said charge transfer phase wherein said sixth switch circuit is in said OFF state.

4. The amplification circuit of claim 3, further comprising:
a seventh switch circuit having an ON state connecting said fifth node to said third node and an OFF state isolating said fifth node from said third node;
wherein said amplification circuit further operates in
said first signal accumulation operation of said integration phase wherein said third switch circuit and said seventh switch circuit are in said ON state, and said sixth switch circuit is in said OFF state,
said second signal accumulation operation of said integration phase wherein said third switch circuit is said ON state, and said sixth switch circuit and said seventh switch circuit are in said OFF state,
said discharge phase wherein said third switch circuit and said seventh switch circuit are in said ON state, and said sixth switch circuit is in said OFF state, and
said charge transfer phase wherein said third switch circuit, said sixth switch circuit and said seventh switch circuit are in said OFF state.

5. The amplification circuit of claim 4, wherein:
said amplification circuit operates in
said initial phase wherein said third switch circuit is off, and said fourth switch circuit and said seventh switch circuit are in said ON state, and
said initial phase said fourth switch circuit, said seventh switch circuit and said sixth switch circuit form a conduction path in said initial phase; and
said current supply circuit supplies discharge current to the said conduction path and operates as said second capacitor discharge circuit.

6. The amplification circuit of claim 5, further comprising:
an eighth switch circuit having an ON state connecting a sixth node shared by said first switch circuit and said third capacitor to said second node and an OFF state isolating said sixth node from said second node;
a ninth switch circuit having an ON state connecting said fifth node to said second node and an OFF state isolating said fifth node from said second node;
wherein said amplification circuit further operates in
said initial phase, said integration phase, said discharge phase and said charge transfer phase wherein said eighth switch circuit is in said ON state, and said ninth switch circuit is in said OFF state, and
a correction phase after said charge transfer phase wherein said first switch circuit, said fifth switch circuit, and said ninth switch circuit are in said ON state, and said second switch circuit, said third switch circuit, said sixth switch circuit, said seventh switch circuit and said eighth switch circuit are in said OFF state.

7. The amplification circuit of claim 2, wherein:
said first capacitor comprises multiple unit capacitors connected in parallel; and
said amplification circuit further comprises a selection circuit selecting at least some of said multiple unit capacitors according to a gain setting signal, and connecting said selected unit capacitors between said first node and said second node in said charge transfer phase.

8. The amplification circuit of claim 2, wherein:
said input circuit further receiving a first reference signal and a second reference signal and connecting a selected one of said first signal, said second signal, said first reference signal or said second reference signal to said first node; and
wherein said amplification circuit further operates in said integration phase including
a first reference signal accumulation operation in which said first switch circuit is in said ON state, said second switch circuit is in said OFF state, and said input circuit connects said first reference signal to said first node, and
a second reference signal accumulation operation in which said first switch circuit is said OFF state, said second switch circuit is said ON state, and said input circuit connects said second reference signal to said first node, said second reference signal accumulation operation following said first reference signal accumulation operation; and
repeated a number of times corresponding to the amplification factor.

9. The amplification circuit of claim 2, further comprising:
a tenth switch circuit having an ON state connecting said first node to said reference voltage and an OFF state isolating said first node from said reference voltage;
wherein said amplification circuit further operates in said discharge phase wherein said first switch circuit and said tenth switch circuit are in said ON state, and said first switch circuit and said tenth switch circuit, form a conduction path and operate as said first capacitor discharge circuit.

10. The amplification circuit of claim 2, further comprising:
a hold circuit holding said first signal and said second signal at a prescribed timing.

11. An imaging device, comprising:
a pixel array including multiple pixel circuits arranged in the form of a matrix of plural rows and plural columns;
a pixel scan circuit successively selecting each row of said pixel array and outputting a first signal corresponding to the respective noise level from N pixel circuits belonging to the selected row, and a second signal corresponding to an imaging level;
N amplification circuits, each amplification circuit amplifying the difference between said first signal and said second signal output from said N pixel circuits, each amplification circuit including
a first capacitor connected between a first node and a second node;
a second capacitor connected between a third node and a fourth node;
an input circuit receiving said first signal and said second signal and connecting a selected one of said first signal or said second signal to said first node;
a first switch circuit having an ON state connecting said second node to a reference voltage and an OFF state isolating said second node from the reference voltage;
a second switch circuit having an ON state connecting said second node to said third node and an OFF state isolating said second node from said third node;
a current supply circuit supplying current to said fourth node whereby a voltage at said third node will approach said reference voltage;
a second capacitor discharge circuit selectively discharging said second capacitor; and
wherein said amplification circuit operates in
an initial phase wherein said second capacitor discharge circuit discharges the charge in said second capacitor, an integration phase including
- a first signal accumulation operation wherein said first switch circuit is in said ON state, said second switch circuit is in said OFF state and said input circuit inputs said first signal to said first node, and
- a second signal accumulation operation wherein said first switch circuit is in said OFF state, said second switch circuit is in said ON state and said input circuit inputs said second signal to said first node, following said first signal accumulation operation, repeated a number of times corresponding to an amplification factor.

* * * * *